United States Patent
Exner et al.

(10) Patent No.: US 11,864,294 B2
(45) Date of Patent: Jan. 2, 2024

(54) ILLUMINATION-BASED ASSISTANCE DURING EXTRAVEHICULAR ACTIVITY

(71) Applicant: Sony Group Corporation, Tokyo (JP)

(72) Inventors: Peter Exner, Malmö (SE); Hannes Bergkvist, Rydeback (SE)

(73) Assignee: SONY GROUP CORPORATION, Tokyo (JP)

( * ) Notice: Subject to any disclaimer, the term of this patent is extended or adjusted under 35 U.S.C. 154(b) by 57 days.

(21) Appl. No.: 17/966,950

(22) Filed: Oct. 17, 2022

(65) Prior Publication Data

US 2023/0139061 A1    May 4, 2023

(30) Foreign Application Priority Data

Nov. 3, 2021   (SE) .................................... 2151351-0

(51) Int. Cl.
   *H05B 47/115*   (2020.01)
   *B64G 6/00*     (2006.01)
   *G08B 7/06*     (2006.01)

(52) U.S. Cl.
   CPC ............. *H05B 47/115* (2020.01); *B64G 6/00* (2013.01); *G08B 7/06* (2013.01)

(58) Field of Classification Search
   None
   See application file for complete search history.

(56) References Cited

U.S. PATENT DOCUMENTS

| | | | |
|---|---|---|---|
| 11,029,160 B1 | 6/2021 | Keith | |
| 2010/0090866 A1* | 4/2010 | Chen | ........................ B64G 6/00 340/953 |
| 2014/0085446 A1* | 3/2014 | Hicks | ................... G09B 21/001 348/62 |
| 2014/0375683 A1 | 12/2014 | Salter | |
| 2015/0309578 A1 | 10/2015 | McCoy | |
| 2018/0252396 A1 | 9/2018 | Ashoori | |
| 2019/0222753 A1 | 7/2019 | Chernikov | |

(Continued)

FOREIGN PATENT DOCUMENTS

| | | |
|---|---|---|
| EP | 3862989 A1 | 8/2021 |
| KR | 101846330 B1 | 4/2018 |
| WO | 2021041755 A1 | 3/2021 |

OTHER PUBLICATIONS

Office Action and Search Report from corresponding Swedish Application No. 2151351-0, dated May 31, 2022, 8 pages.

*Primary Examiner* — Wilson Lee
(74) *Attorney, Agent, or Firm* — TUCKER ELLIS LLP

(57) ABSTRACT

A device is configured to provide assistance during extravehicular activity. The device obtains and operates on first data indicative of one or more objects in a detection space. The device is configured to process the first data for determination of one or more properties for the object(s); evaluate, based on the one or more properties, the object(s) in relation to a set of rules to determine one or more user instructions, and cause an illumination arrangement to provide the one or more user instructions by selective projection of the light in relation to the one or more objects. The device thereby reduces the reliance on cognitive processing by user(s) to take decisions on how to proceed in a situation, and instead the cognitive processing of information about the surroundings in relation to the task at hand is offloaded to the device.

20 Claims, 12 Drawing Sheets

(56) References Cited

U.S. PATENT DOCUMENTS

2020/0128902 A1\* 4/2020 Brown .................. A42B 3/042
2020/0326537 A1 10/2020 Busey
2020/0334851 A1 10/2020 Hansson
2021/0270436 A1\* 9/2021 Kanade .................... F21L 4/02

\* cited by examiner

ILLUMINATION-BASED ASSISTANCE DURING EXTRAVEHICULAR ACTIVITY

CROSS REFERENCE TO RELATED APPLICATIONS

The present application claims priority to Swedish patent application 2151351-0, filed Nov. 3, 2021, the content of which is incorporated herein by reference in its entirety.

TECHNICAL FIELD

The present disclosure relates generally to equipment for use in low-gravity environments and, in particular, to such equipment for providing assistance to individuals in low-gravity environments.

BACKGROUND ART

Extravehicular activity (EVA) is any activity done by an individual outside a spacecraft beyond the Earth's appreciable atmosphere, i.e. in a low-gravity environment. EVAs include spacewalks, surface exploration, maintenance and repair, etc. An individual that travels into space is commonly known as an astronaut, cosmonaut, or taikonaut.

During EVA, the individual wears a space suit, which is a garment designed to keep a human alive in the harsh environment of outer space. Apart from the overall challenges of moving around in low gravity, the individual also struggles with limited field of vision, limited flexibility of the pressurized space suit, and adverse lightning conditions. An individual that performs a task during EVA will face many challenges. One challenge is to avoid falling when walking on an unexplored surface, since falling may result in undesired contamination of the space suit by regolith. The fall may also result in damages to the space suit, and the individual may require assistance to get back on feet. Another challenge of working in low-gravity environments is to track and manipulate multiple objects when performing tasks that require a high level of focus and concentration, for example service and repair. Yet another challenge is to perform any task that requires collaboration among individuals.

Adverse lighting conditions may be remedied by external lighting or an illumination device attached to the space suit. In this context, U.S. Ser. No. 11/029,160 proposes to attach a projector to the space suit or a vehicle and operate the projector to produce an image on the terrain to provide information to an individual. The image may be a grid pattern that helps the individual to appreciate the structure of the terrain. The image may also be a schematic or the like, which is projected onto an article in the terrain to help the individual during service or repair of the article. The image may also indicate presence of minerals, water or ice in the terrain, as detected by a sensor. While being capable of assisting the individual, the projector system is reliant on the attention and cognitive ability of the individual. Even if astronauts are highly trained and well-prepared, they are in a vulnerable and potentially stressful situation on EVAs. Further, with the development of augmented reality (AR) displays, astronauts are likely to be exposed to increasing amounts of information during EVAs and projecting information into the surroundings for cognitive processing by the astronaut may be more confusing than helpful to the astronaut.

BRIEF SUMMARY

It is an objective to at least partly overcome one or more limitations of the prior art.

Another objective is to provide a technique that provides assistance to one or more individuals during extravehicular activity.

Yet another objective is to provide such a technique that improves the performance of a task by the one or more individuals.

One or more of these objectives, as well as further objectives that may appear from the description below, are at least partly achieved by a device for assisting an individual during extravehicular activity, a space suit, a computer-implemented method, or a computer-readable medium according to the independent claims, embodiments thereof being defined by the dependent claims.

Still other objectives, as well as features, aspects and technical effects will appear from the following detailed description, from the attached claims as well as from the drawings.

DETAILED DESCRIPTION OF EXAMPLE EMBODIMENTS

Figure 1:
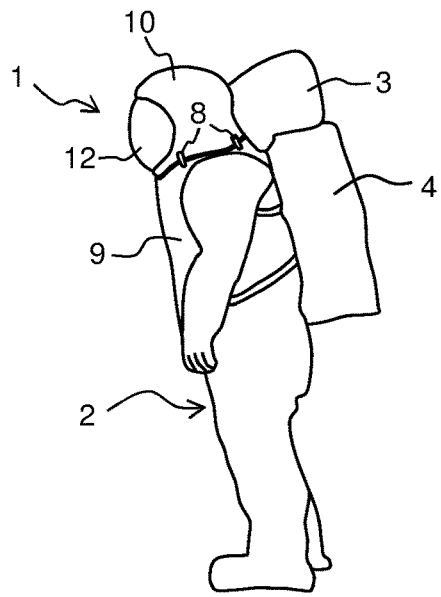
FIG. 1 is a side view of an individual dressed in an example space suit.

Embodiments will now be described more fully hereinafter with reference to the accompanying schematic drawings, in which some, but not all, embodiments are shown. Indeed, the subject of the present disclosure may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments.

As used herein, the terms "multiple", "plural" and "plurality" are intended to imply provision of two or more elements, whereas the term a "set" of elements is intended to imply a provision of one or more elements. The term "and/or" includes any and all combinations of one or more of the associated listed elements.

It will furthermore be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing the scope of the present disclosure.

Well-known functions or constructions may not be described in detail for brevity and/or clarity. Unless otherwise defined, all terms (including technical and scientific terms) used herein have the same meaning as commonly understood by one of ordinary skill in the art to which this disclosure belongs.

Like numerals refer to like elements throughout.

Before describing embodiments in more detail, a few definitions will be given.

As used herein, "extravehicular activity", EVA, refers to any activity done by an individual outside a spacecraft beyond the Earth's appreciable atmosphere.

As used herein, "audible sound" refers to a sound that falls within the hearing range of humans, typically 20-20,000 Hz.

As used herein, "visible light" refers to electromagnetic radiation that is visible to the human eye, typically in the wavelength range of 300-1100 nm.

Embodiments relate to various aspects of devices and methods for assisting individuals during EVA. The following description is separated into Chapters 1-3 dealing with inventive concepts for EVA assistance. The separation into chapters is made for clarity of presentation and does not imply that the concepts cannot be combined. On the contrary, the concepts and embodiments thereof may indeed be combined in various constellations to achieve corresponding synergistic effects, as will be appreciated by the persons skilled in the art.

For context only, FIG. 1 schematically shows an individual 1 wearing a space suit 2 for EVA. Space suits for EVA are designed to provide stable internal pressure and enable the individual to move its limbs, and to shield against different types of radiation as well as micrometeoroids. Various equipment may be attached to or integrated with the space suit 2, for example a portable life support system (PLLS) 3 and a maneuvering unit 4. The PLLS 3 may be configured to, for example, regulate suit pressure, provide breathable oxygen, remove carbon dioxide, humidity, odors, and contaminants from breathing oxygen, cool and recirculate gas or liquid through the space suit. The maneuvering unit 4 may be configured to provide propulsion power for controlled movement of the individual in free space. In the illustrated example, the space suit 2 comprises a garment portion 9 and a helmet 10. The helmet 10 is releasably attached to the top of the garment portion 9 by a fastener arrangement 8. The helmet 10 is typically rigid and comprises a transparent visor 12 that defines the available field of vision of the individual.

The space suit 2 and any auxiliary equipment 3, 4 may be seen to be part of a space suit system, SSS, which is electronically controlled. The SSS includes a control device that comprises logic configured to control the operation of the SSS. The logic may be implemented in hardware, software or a combination of both hardware and software.

Figure 2:
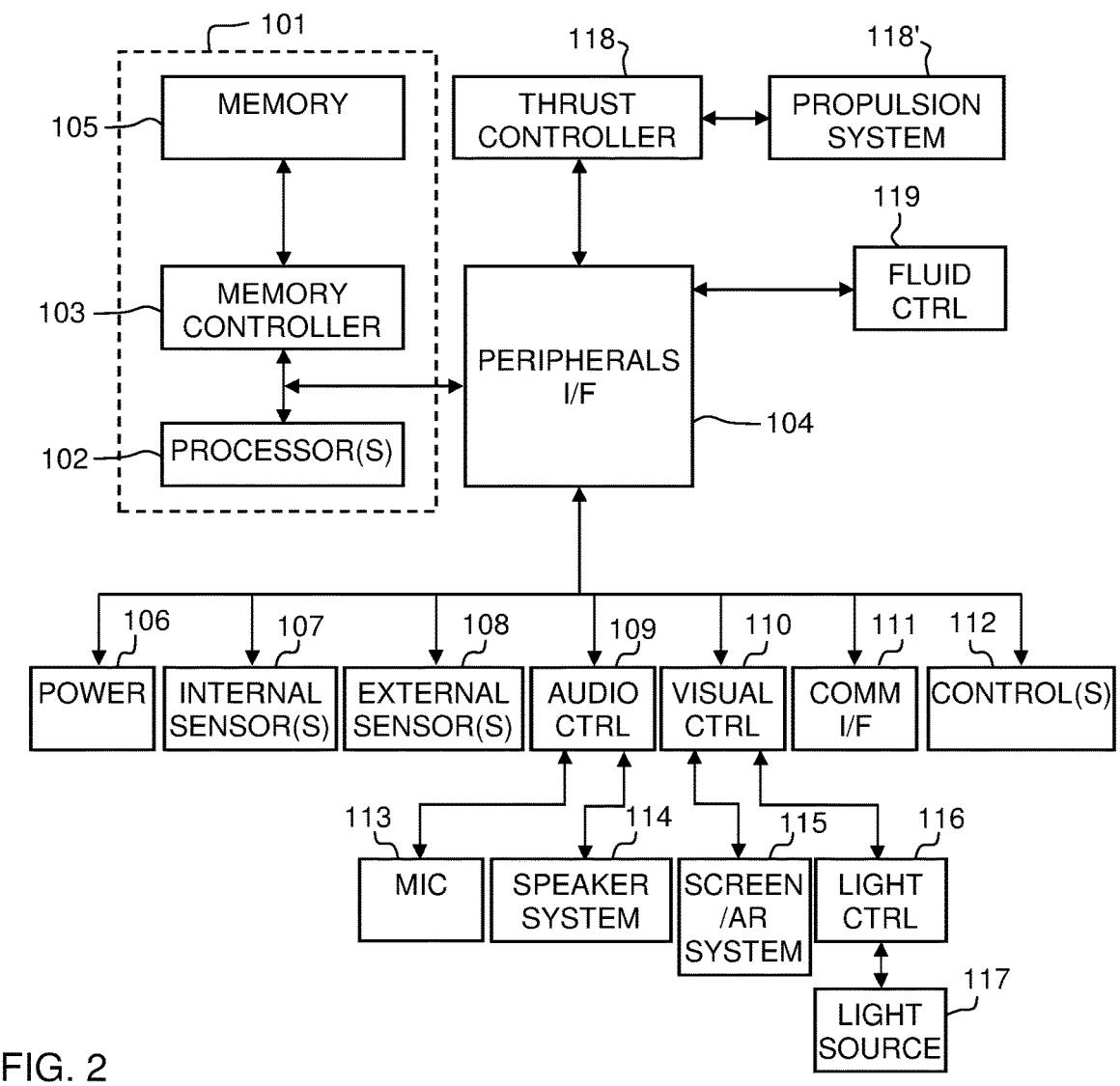
FIG. 2 is a block diagram of an example control system for a space suit.

A detailed example of an SSS is depicted in FIG. 2. In the illustrated example, the SSS includes one or more processors 102, a memory controller 103, a peripherals interface (I/F) 104, a memory 105, a source 106 of electrical power, an arrangement 107 of internal sensors, an arrangement 108 of external sensors, audio control circuitry 109, visual control circuitry 110, a communication interface (I/F) 111, one or more manual controls 112 for user input, a microphone 113, a speaker system 114, a display system, optionally configured for augmented reality (AR), light control circuitry 116, one or more light sources 117, thrust control circuitry 118, a propulsion system 118' and fluid control circuitry 119. One or more of these components may communicate over one or more communication buses or signal lines as represented by arrows in FIG. 2.

FIG. 2 is only one example of an SSS system. An SSS may thus include more or fewer components than those shown in FIG. 2, may combine two or more components as functional units, or a may have a different configuration or arrangement of the components. Some of the various components shown in FIG. 2 may be implemented in hardware, software or a combination of both hardware and software, including one or more signal processing and/or application-specific integrated circuits.

In some embodiments, the processor 102 runs or executes various software programs and/or sets of instructions stored in memory 105 to perform various functions of the SSS and to process data. In some embodiments, processor 102 includes one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). The memory 105 may include one or more computer-readable storage mediums, such as high-speed random access memory, and/or non-volatile memory, such as one or more magnetic disk storage devices, flash memory devices, or other non-volatile solid-state memory devices. Access to memory 105 by other components such as the processor(s) 102 and the peripherals I/F 104 may be controlled by the memory controller 103. The peripherals I/F 104 may couple input and output peripherals to the processor(s) 102 and memory 105. In some embodiments, the processor(s) 102, the memory controller 103 and the memory 105 are part of the above-mentioned control device 101, which is indicated by dashed lines and may or may not be integrated on a single chip.

In some embodiments, software components stored in memory 105 include an operating system, and a set of software modules or applications. The software modules may correspond to a set of instructions for performing one or more functions by use of components shown in FIG. 2. For clarity, such software modules are not shown in FIG. 2. The operating system may comprise various software components and/or drivers for controlling and managing general system tasks (for example, memory management, storage device control, power management, etc.) and facilitates communication between various hardware and software components.

In some embodiments, the SSS includes a source 106 of electrical power ("power system") for powering its various components. The power system 106 may include a power management system, one or more local power sources such as battery, fuel cell, photovoltaic cells, etc., a recharging system, a power failure detection circuit, a power converter or inverter, a power status indicator and any other components associated with the generation, management and distribution of power in a computerized device.

In some embodiments, the SSS includes an arrangement 107 of internal sensors, which are configured to detect and/or measure properties of the individual and/or the interior of the space suit. The arrangement 107 may, for example, comprise sensors for measuring gas pressure, gas composition, temperature, humidity, heart activity, blood pressure, stress level, etc. In some embodiments, the arrangement 107 comprises at least one of a head tracking device or a gaze tracking device. The head tracking device is configured to determine the momentary pose of the head of the individual inside the helmet and may be based on any conventional technique such as computer vision and/or inertial sensors directly or indirectly attached to the head. In another alternative, the pose of the head is determined by the use of cooperating elements on the head and the inside of the helmet, for example magnets and magnetic field sensors, or light emitters and light sensors. The gaze tracking device is configured to determine the momentary gaze direction of the individual, by measuring eye positions and eye movement. The gaze tracking device may be based on any conventional technique such as optical tracking by computer vision, eye-attached tracking or electrical potential measurement by electrodes placed around the eyes. In some embodiments, the arrangement 107 comprises sensors for measuring the momentary body pose of the individual ("body pose sensors"). The body pose may be given in any detail and may thus define the relative position of any number of limbs. The body pose sensors may comprise wearable inertial sensors directly or indirectly attached to various limbs of the individual and/or to various portions of the space suit. Alternatively or additionally, the body pose sensors may comprise strain sensors directly or indirectly attached to the individual and/or the space suit.

In some embodiments, the SSS includes an arrangement 108 of external sensors, which are configured to detect and/or measure properties in the surroundings of the individual. The arrangement 108 may, for example, comprise sensors for measuring environmental parameters such as gas composition, temperature, etc. In some embodiments, the arrangement 108 comprises one or more sensors for detection of objects and/or one or more properties of objects in a detection space around the individual. The detection space may have any shape and extent. In some embodiments, the detection space is omnidirectional. Such an arrangement 108 may be configured to generate measurement data representative of one or more of a position, a shape, a distance, a temperature, or a composition of an object. Examples of sensors in the arrangement 108 include vision sensors that provide a two-dimensional (2D) or three-dimensional (3D) representation within a field of view. The vision sensor may be an array detector or camera for radiation detection in one or more wavelength regions, for example a visual camera, a thermal camera, a multispectral camera, etc. Other examples of vision sensors include Light Detection and Ranging (LIDAR) systems, Radio Detection and Ranging (RADAR) systems, ultrasonic sensors, etc.

In some embodiments, the SSS comprises audio control circuitry 109, which is configured to allow the individual to communicate with other individuals and/or generate voice commands for a voice-controlled device. The other individuals may be located inside or outside of a spacecraft or in a mission control center, for example on Earth. The audio control circuitry 109 is connected to one or more microphones 113 and a speaker system 114 inside the space suit. The microphone(s) 113 and the speaker system 114 may be attached to the head of the individual and/or to the inside of the helmet.

In some embodiments, the SSS comprises visual control circuitry 110, which is configured to visually present information to the individual. The visual information may represent data generated by the arrangements 107, 108 or data received via the communication I/F 111. In some embodiments, the visual control circuitry 110 is connected to a display device 115, which may be integrated into or associated with the visor (cf. 12 in FIG. 1) and/or be worn on the individual's head or eyes. The display device 115 may or may not be configured to provide augmented reality (AR). For example, the display device 115 may comprise one or more of a head-up-display (HUD), bionic contact lenses, a virtual retinal display, AR enabled eyeglasses, etc. In some embodiments, the visual control circuitry 110 is connected to light control circuitry 116, which is operable to control one or more light sources 117 to project visible light into the surroundings of the space suit. The light control circuitry 116 may control the spatial distribution and/or the wavelength of the light provided by the light source 117. In one example, the light source 117 is operable to selectively direct a light beam into the surroundings, for example by use of a conventional beam scanner. In another example, the light source 117 is operable to generate and project a static beam into the surroundings.

In some embodiments, the SSS comprises a communication I/F 111, which is configured for reception of communication signals, for example, in the form of electromagnetic signals. The communication I/F 111 may enable local communication with a spacecraft or other space suits, as well as remote communication with a mission control center. The transmission and reception of communication signals may be carried out wirelessly, for example via a radio frequency (RF) transceiver. In some embodiments, the communication I/F 111 includes RF circuitry, which is configured to convert electrical signals to/from electromagnetic signals and communicate with communication networks and other communication devices via the electromagnetic signals. The RF circuitry may include well-known circuitry for transmission and reception of communication signals, including but not limited to an antenna system, an RF transceiver, one or more amplifiers, a tuner, one or more oscillators, a digital signal processor, a CODEC chipset, etc. The wireless communication may use any available communication standards, protocols and technologies.

In some embodiments, the SSS comprises one or more manual controls 112 for user input. The manual controls may comprise one or more physical buttons (e.g., push buttons, rocker buttons, etc.), dials, levers, keys, slider switches, joysticks, click wheels, and so forth.

In some embodiments, the SSS comprises thrust control circuitry 118, which is configured to control the thrust generated by a propulsion system 118', which may be included in the SSS (cf. maneuvering unit 4 in FIG. 1). The thrust control circuitry 118 may be operable to control the magnitude and direction of the thrust. The propulsion system 118' may be operable to release a fluid to generate the desired thrust. In a non-limiting example, the fluid comprises one or more of oxygen or nitrogen. The propulsion system 118' may be activated to move the individual in space, for example during a spacewalk.

In some embodiments, the SSS comprises fluid control circuitry 119, which is configured to control the supply and/or removal of one or more fluids within the space suit. The fluid control circuitry 119 may correspond to the PLLS 3 in FIG. 1.

1. Audio-Based Assistance During Extravehicular Activity

This part of the disclosure relates to a technique of providing assistance to an individual or user during EAV to improve the user's perception of the surrounding environment. This part of the disclosure is particularly, but not exclusively, related to an inventive concept of indicating presence of an object in the surrounding environment by generating an audible sound with a perceived origin, for the user, that corresponds to the location of the object in relation to the user's head. The audio-based assistance is thereby intuitive to the user and may be provided without occluding or obstructing the user's field of vision.

The inventive concept will be further explained with reference to FIGS. 3A-3B, which are top plan views onto a head 20 inside an example helmet 10 of a space suit. For illustration purposes, the helmet 10 is shown in cross-section. The direction of the head 20 is indicated by the location of the nose 21 and the ears 22. As shown, the helmet 10 defines a protective shell 11 around the head 20. The shell 11 is spaced from the head 20, which is thereby movable in relation to the helmet 10. This is a common property of space suit helmets. Conventionally, the helmet 10 is shaped as a spheroidal dome in order to balance the need for field of view, pressure compensation, and low weight.

Figure 3A:
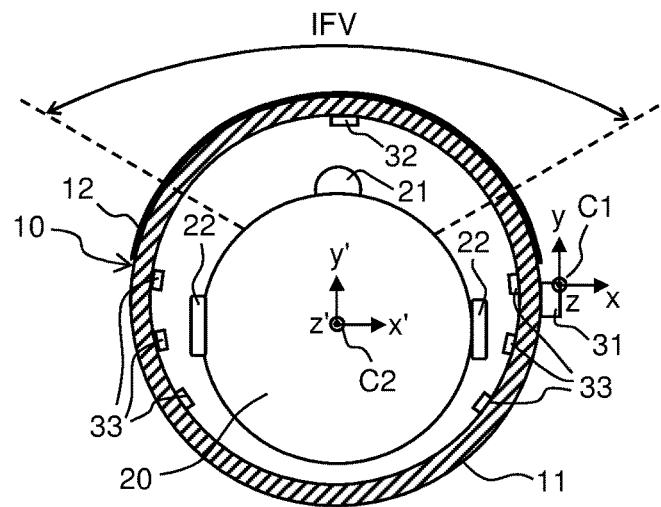
FIGS. 3A-3B are top plan views, partly in section, of example head poses in a helmet of a space suit.
Figure 3B:
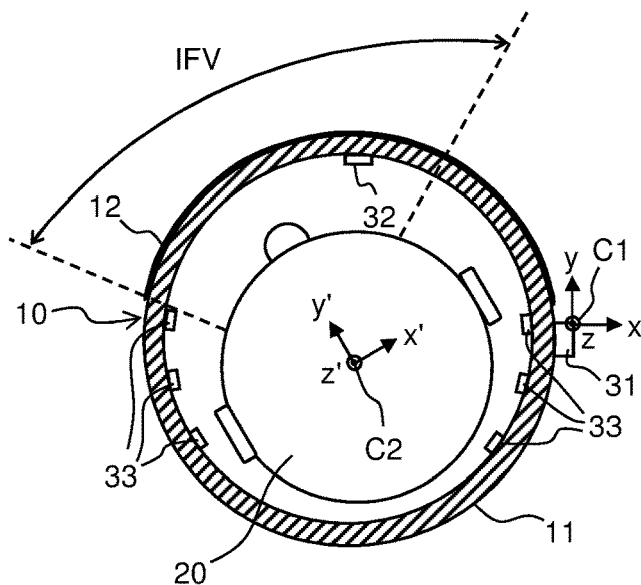

In the example of FIGS. 3A-3B, an external monitoring sensor 31 is arranged on the helmet 10. The term external does not imply that the monitoring sensor 31 needs to be located on the outside of the space suit but rather that it is configured to generate external sensor data, ESD, which is indicative of a detection space outside and around the helmet 10. In some embodiments, the monitoring sensor 31 is configured to generate measurement data indicative of objects in the detection space. Such measurement data is at least indicative of the position of the object in relation to the monitoring sensor 31 and may also be indicative of a property of the object, such as its shape, its temperature, or its composition. The monitoring sensor 31 may be part of the arrangement 108 as depicted in FIG. 2 and may be implemented as a vision sensor.

The monitoring sensor 31 need not be arranged on the helmet 10, but may be arranged anywhere on the space suit. Further, a plurality of monitoring sensors 31 may be arranged to provide the ESD. In one example, at least some of the monitoring sensors 31 are identical and arranged at different locations on the space suit, for example to increase the detection space. In another example, at least some of the monitoring sensors 31 are of different types, for example to increase the diversity of the ESD and increase the ability to detect objects and/or properties of objects.

In the example of FIGS. 3A-3B, a head tracking device 32 is arranged on the helmet 10 to generate head pose data, HPD, which is indicative of the momentary head pose. As used herein, "head pose" refers to the orientation, and optionally also the location, of the head 20 inside and in relation to the helmet 10. In the illustrated example, the head tracking device 32 is arranged inside the helmet 10 but it may alternatively be located on the outside. The head tracking device 32 may be part of the arrangement 107 as depicted in FIG. 2.

FIGS. 3A-3B also illustrate the provision of an array of speakers 33 that are distributed on the inside of the helmet 10. The number of speakers 33 in the array is at least two to enable spatialization of the generated sound (below). In a variant, the speakers 33 are arranged in a headset located on the ears 22 of the user. The array of speakers 33 may be part of the speaker system 114 as depicted in FIG. 2.

To facilitate the following discussion, first and second coordinate systems C1, C2 are indicated in FIGS. 3A-3B. The first coordinate system C1 is fixed in relation to the sensor 31. The second coordinate system C2 is fixed in relation to the head. The coordinate systems C1, C2 are shown as Cartesian systems of (x,y,z) axes and (x',y',z') axes, respectively, but any other coordinate system may be used, for example polar coordinate systems.

The helmet 10 also comprises a transparent visor 12, which allows the user to view the surroundings in front of the helmet 10. In FIGS. 3A-3B, the dashed lines represent the limits of the central vision of the user, when keeping the head in a fixed position and only moving the eyes. Thus, in FIGS. 3A-3B, IFV designates the available span of central vision. The central vision is also known as foveal vision and allows the user to distinguish detail, color, and shape of objects. Outside the central vision, in the regions of paracentral vision, mid-peripheral vision and far-peripheral vision (collectively denoted "peripheral vision" herein), humans find it difficult to distinguish between objects. Humans therefore tend to move their head to scan the surroundings. Further, upon perceiving that an object is present within the peripheral vision, humans tend to turn their head towards the object to bring it into central vision.

In FIG. 3A, the user faces the visor 12 and has an IFV that is unobstructed by the helmet 10, at least in the horizontal direction. In FIG. 3B, the individual has turned the head 20 to the left, and the IFV is partially delimited by the non-transparent helmet material to the left of the visor 12. When also considering the peripheral vision of the user, it is realized that the helmet 10 will obstruct at least part of the peripheral vision for all orientations of the head 10 within the helmet 10. Thus, the field of vision including peripheral vision may be invariant of head pose.

To visually scan a larger portion of the surroundings, the user will have to twist the torso or the entire body to turn the helmet 10. This may be quite difficult and takes time in low gravity. Given the visual constraints of the helmet 10, the user is vulnerable to emerging objects that may pose a hazard to the user. Also, the visual constraints may make it quite cumbersome for the user to perform various tasks in relation to one or more surrounding objects. It should be borne in mind that objects, and also the user, gravitate towards heavier objects over time in free space as a result of the low gravity. Thus, the combination of low gravity and visual constraints may cause an undesirable change in the location of an object to go unnoticed by the user. There is thus a general desire to improve the awareness of the surroundings for a user that wears a space suit in a low gravity environment.

Figure 4:
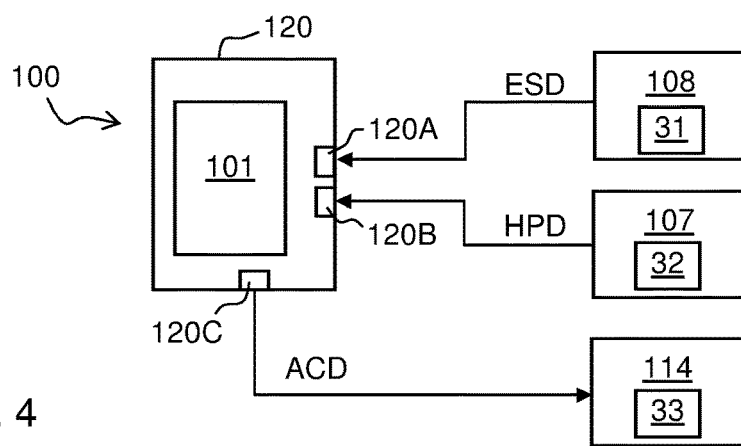
FIG. 4 is a block diagram of an example device for audio-based assistance of an individual performing an extravehicular activity.

This objective is at least partly achieved by a device 120 shown in FIG. 4. The device 120 is part of a system 100, which also includes the monitoring sensor(s) 31, the head tracking device 32 and the array of speakers 33. The device 120 comprises processor circuitry 101, which may correspond to the control device 101 in FIG. 2, a first input device 120A configured to receive the ESD from the monitoring sensor(s) 31, and a second input device 120B configured to receive the HPD from the head tracking device 32. The input devices 120A, 120B ("inputs") may comprise any conventional hardware interface, optionally combined with software, for receiving input signals. The device 120 further comprises an output device 120C ("output") configured to provide audio control data, ACD, to the array of speakers 33, optionally via the audio control circuitry 109 in FIG. 2. In FIG. 4, the monitoring sensor 31 is part of the sensor arrangement 108, the head tracking device 32 is part of the sensor arrangement 107, and the speakers 33 are part of the speaker system 114.

The device 120 in FIG. 4 may be included in the space suit 2, for example by manufacture or retrofitting. The device 120 may be a unitary component or an assembly of separate parts. It is also conceivable that the device 120 includes one or more additional components of the system 100, for example the array of speakers 33, the monitoring sensor(s) 31, or the head tracking device 32. In some embodiments, the helmet 10 is also part of the device 120.

Figure 5:
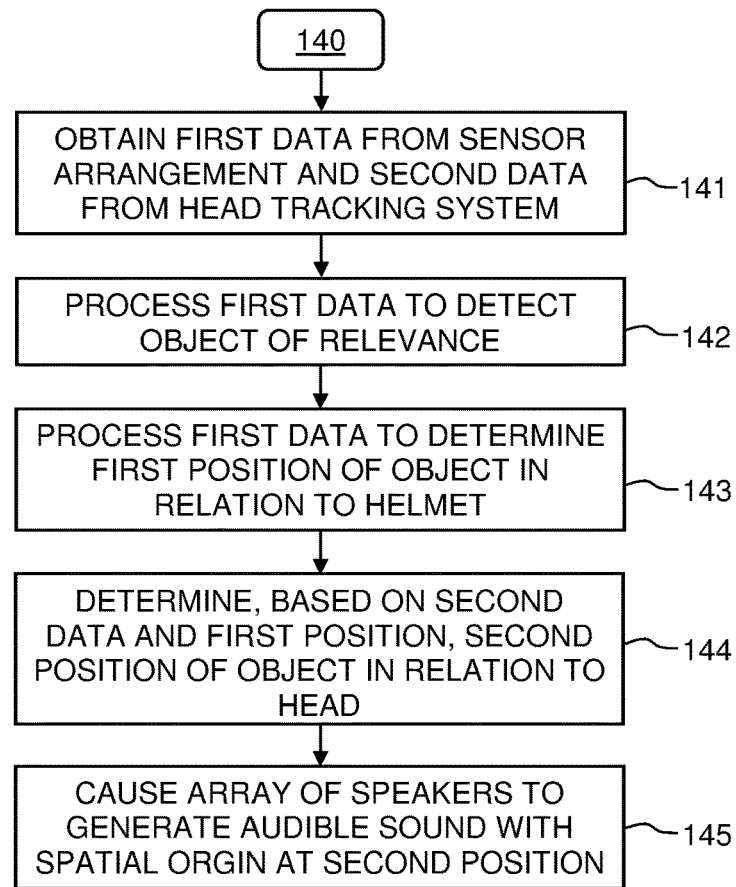
FIG. 5 is a flow chart of an example method for audio-based assistance.

FIG. 5 is a flowchart of an example method 140 for assisting a user during EVA. The method 140 is computer-implemented and may be performed by the device 120 in FIG. 4. The method 140 may be implemented by hardware or a combination of hardware and software, for example by program instructions stored in a memory in the device 120. The method 140 comprises steps 141-145, which may be repeated over time to provide continuous assistance to the user.

In step 141, first data and second data are obtained. The first data is indicative of the detection space around the user. The first data corresponds to the ESD in FIG. 4 and is obtained by the device 120 via input 120A. The detection space is defined by the volume in which the one or more monitoring sensors 31 are responsive to objects. The second data is indicative of the user's head pose relative to the helmet 10. The second data corresponds to the HPD in FIG. 4 and is obtained by the device 120 via input 120B.

In step 142, the first data is processed for detection of an object of relevance to the user in the detection space. The object of relevance may be any type of object in a broad sense. The object may thus be a tactile object, such as a man-made implement, a piece of terrain, another user in a space suit, space debris, a meteoroid, etc. The object may also be an impalpable object, such as a region of increased/decreased temperature, a formation of gas, etc. Step 142 may detect any number of objects of relevance. In some embodiments, any and all objects that are detected within the detection space may be considered to be an object of relevance in step 142. In other embodiments, the object of relevance is confined to one or more specific categories of objects (below).

In step 143, a first position of the respective object with respect to the helmet 10 is determined based on the first data. In the example of FIGS. 3A-3B, the first position is determined in the first coordinate system C1, and may be given by (x,y,z) coordinates. The first position may represent any detectable feature of the object, for example a corner, a geometric center, etc. It is also to be understood that step 143 may determine more than one first position for an object. Although the first position is typically a 3D position given in three dimensions, it may be a 2D position in some embodiments. As used herein, a position that is determined "with respect to the helmet" implies that the position is determined in relation to a reference point on the space suit. Thus, the reference point need not, but may, be located on the helmet.

In practice, steps 142 and 143 may be merged so that the first position of the object is determined as part of the processing for object detection.

In step 144, a second position of the object with respect to the user's head 20 is determined based on the first position from step 143 and the second data (HPD) from step 141. As used herein, a position that is determined "with respect to the head" implies that the position is determined in relation to a reference point on the head 20. By step 144, the second position is determined to locate the object in relation to the head 20 rather than the space suit 2 or the helmet 10. The skilled person understands that the determination in step 144 is feasible since the second data defines a spatial relation between the head 20 and the helmet 10, and the first position defines a spatial relation between the object and the helmet 10. If more than one first position is determined for the object in step 143, a number of second positions may be determined in step 144, for all or a subset of the first positions. In the example of FIGS. 3A-3B, the second position is determined in the second coordinate system C2, and may be given by (x',y',z') coordinates.

In step 145, the array of speakers 33 is caused to generate an audible sound with a spatial origin given by the second position. Thereby, the user will be informed not only about the presence of the object but also of its location in relation to the user's head. In the context of FIG. 4, step 145 results in the audio control data, ACD, which is output by the control device 120. In some embodiments, the spatial origin is set to coincide with the second position. In other embodiments, the spatial origin is set in the direction of the object from the user's head 20, for example somewhere along a line connecting the head 20 and the second position. For the latter embodiments, the audible sound will not reproduce the distance to the object but still inform the user about the direction to the object.

The generation of audible sound with a specific spatial origin is commonly known as "3D audio spatialization" and involves manipulating the audio signals to different speakers in the array of speakers 33, so as to achieve a desired virtual placement of the spatial origin of the resulting audible sound.

In a non-limiting example, 3D audio spatialization is achieved by use of so-called head-related transfer functions (HRTFs) for speakers with a known placement. An HRTF module may be configured to obtain HRTFs for two or more speakers 33, based on the second position. The HRTF module may retrieve the HRTFs from an HRTF database, which associates HRTFs with positions. Such a database may be generic for all users or tailored to a specific user. The HRTF module may be configured to select the best match of HRTFs from the database given the second position, or perform an interpolation among the HRTFs in the database based on the second position. The selected HRTFs are then operated on a base signal to generate audio signals for the individual speakers. This operation may be done in the time domain or the frequency domain, as is well known in the art.

In some embodiments, the 3D audio spatialization is implemented by the control device 120, and the ACD is provided in the form of audio signals for individual speakers 33. In other embodiments, the 3D audio spatialization is implemented by the audio control circuitry 109 in FIG. 2, and the ACD is merely indicative of the spatial origin. Partitioning of the 3D audio spatialization between the device 120 and the audio control circuitry 109 is also conceivable.

Figure 6:
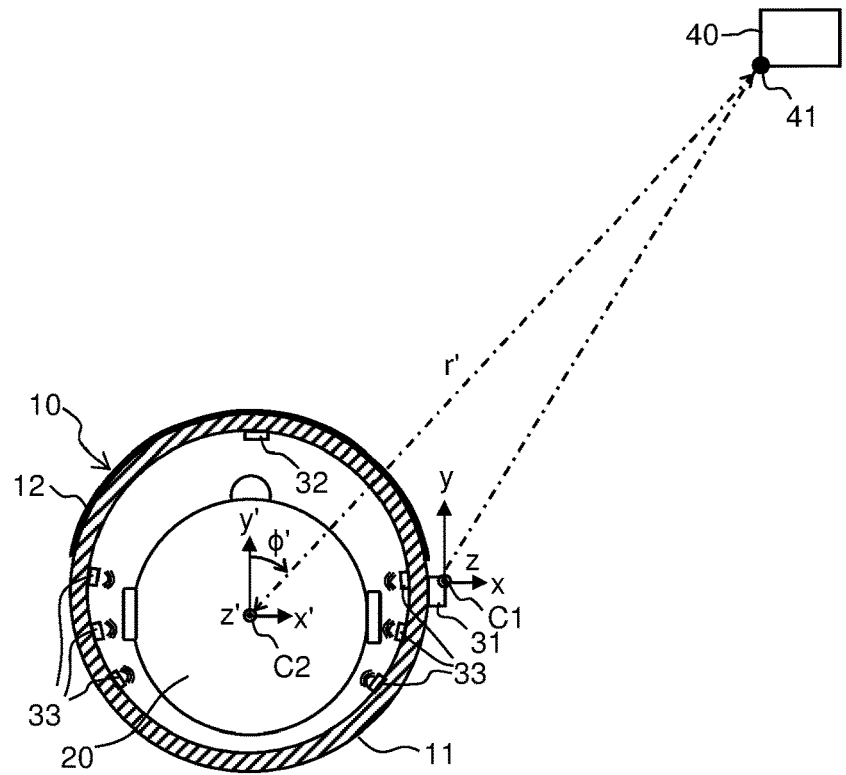
FIG. 6 is a schematic illustration of audio feedback provided by the device in FIG. 4 when operated in accordance with the method in FIG. 5.

The method in FIG. 5 will be further illustrated in FIG. 6, which corresponds to FIG. 3A and shows an object 40 that is located within the detection space of the monitoring sensor 31. The object 40 is detected in step 142, and a first position of the object 40 is determined in relation to the first coordinate system C1 in step 143. In the illustrated example, the first position designates a corner 41 on the object 40. The head pose in relation to the helmet 10, as thus the spatial relation between the first and second coordinate systems C1, C2, is given by second data provided by the head tracking device 32. In step 144, the first position in the first coordinate system C1 is converted into the second position in the second coordinate system C2 based on the second data. For example, a conventional 3D transformation matrix may be defined based on the second data and operated on the first position. For example, as indicated in FIG. 6, the second position may be given by a distance r', an azimuth angle f' in the (x',y') plane and an elevation angle (not shown) in the (y',z') plane. In step 145, as indicated by pressure wave icons in FIG. 6, the speakers 33 are activated to generate audible sound with an origin at the second position in the second coordinate system C2.

In some embodiments, the time response of the measured head pose is set to provide a desired user experience. If the time response is high, the location of the audible sound may instantly represent the head pose. If the time response is low, the impact of fast or temporary head movements may be suppressed. The time response of the measured head pose may be set by a low-pass filter in the sensor arrangement 107 and/or in the device 120.

Figure 7A:
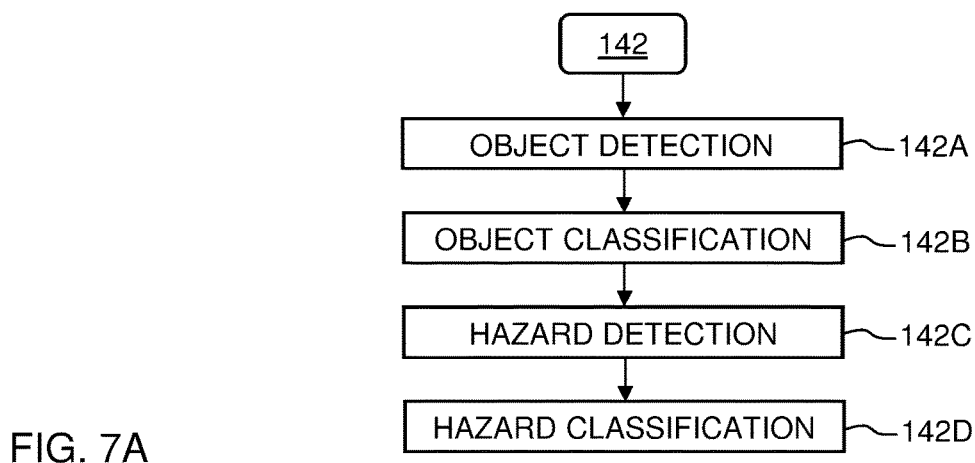
FIGS. 7A-7C are flow charts of example procedures in the method of FIG. 5.

FIG. 7A is a flowchart of an example procedure that may be part of step 142 in the method 140. As will be explained further below, results from step 142 may be used by step 145 when generating the audible sound, for example to diversify the feedback provided by audible sound. In step 142A, the first data is processed for object detection. As noted, the first data may originate from plural monitoring sensors 31, and the data from different monitoring sensors 31 may be merged or fused as part of step 142, for example to determine multiple properties of an object or a 3D shape of the object. In some embodiments, the first data comprises 2D representations ("digital images") and step 142 involves processing the digital images by one or more conventional algorithms for object detection, which may or may not involve object classification (cf. step 142B). Non-limiting examples of such algorithms include various machine learning-based approaches or deep learning-based approaches, such as Viola-Jones object detection framework, SIFT, HOG (Histogram of Oriented Gradients), Region Proposals (RCNN, Fast-RCNN, Faster-RCNN, GCNN), SSD (Single Shot MultiBox Detector), You Only Look Once (YOLO, YOLO9000, YOLOv3), RefineDet (Single-Shot Refinement Neural Network for Object Detection), and RetinaNet. Step 142 may also involve conventional feature detection algorithm(s), for example image processing techniques that are operable to detect one or more of edges, corners, blobs, ridges, etc. in digital images. Non-limiting examples of feature detection algorithms comprise SIFT (Scale-Invariant Feature Transform), SURF (Speeded Up Robust Feature), FAST (Features from Accelerated Segment Test), SUSAN (Smallest Univalue Segment Assimilating Nucleus), Harris affine region detector, and ORB (Oriented FAST and Rotated BRIEF).

Step 142B performs object classification, based on the first data and/or the objects detected in step 142A. Step 142B may thus provide at least one object category for a detected object of relevance. The objects may be classified into different object categories based on any detectable property given by the available monitoring sensors 31, for example shape, temperature, composition, speed, etc. The objects may also be classified based on the above-mentioned object features, if detected in step 142A. As noted, in some embodiments, step 142B may be performed as an integral part of an algorithm used in step 142A.

Step 142C processes at least one of the first data, the objects detected in step 142A, or the object categories determined in step 142B for hazard detection. Step 142C thereby evaluates if the object poses a hazard or risk to the user. Step 142C may thus indicate whether an object is associated with a hazard or not. The presence of hazard may depend on context. For example, during ground exploration in space, unstable ground, steep hills, cliffs, large rocks, sharp objects, space exploration vehicles, buildings, etc. may pose a risk to the user. During a spacewalk, meteorites, space debris, sharp objects, firing thrusters, etc. may pose a risk to the user.

Step 142D processes at least one of the first data, the objects detected in step 142A, or the object categories determined in step 142B for hazard classification. Hazards may be classified into different hazard categories based on any detectable property given by the available monitoring sensors 31, for example shape, size, temperature, composition, speed, movement direction, acceleration, etc. Step 142D may thus provide at least one hazard category for a detected object of relevance.

In FIG. 7A, steps 142B-142D are optional and may be implemented in dependence on the functionality to be provided by step 145. It may also be noted that any one of steps 142A-142D may be performed, at least partly, by a respective monitoring sensor 31, by a pre-processing unit (not shown) in the sensor arrangement 108 in FIG. 4, or by cooperative processing among plural monitoring sensors 31. Thus, with reference to FIG. 4, the first data (ESD) may include raw sensor data from the monitoring sensor(s) 31, pre-processed data, or an indication of object detection, optionally together with an indication of object category and/or detected hazard and/or hazard category. In the context of FIG. 4, when step 142 is performed by the device 120, the processing of the ESD by the device 120 may range from a full processing of raw sensor data in accordance with one or more of steps 142A-142D as described hereinabove, to an extraction of one or more indications of detected object, object category, detected hazard or hazard category from the ESD. A similar partitioning of processing is possible for the position determination in step 143. In the context of FIG. 4, when step 143 is performed by the device 120, the processing of the ESD by the device 120 may range from a full processing of raw sensor data to extracting an indication of the position of the detected object from the ESD.

Figure 7B:
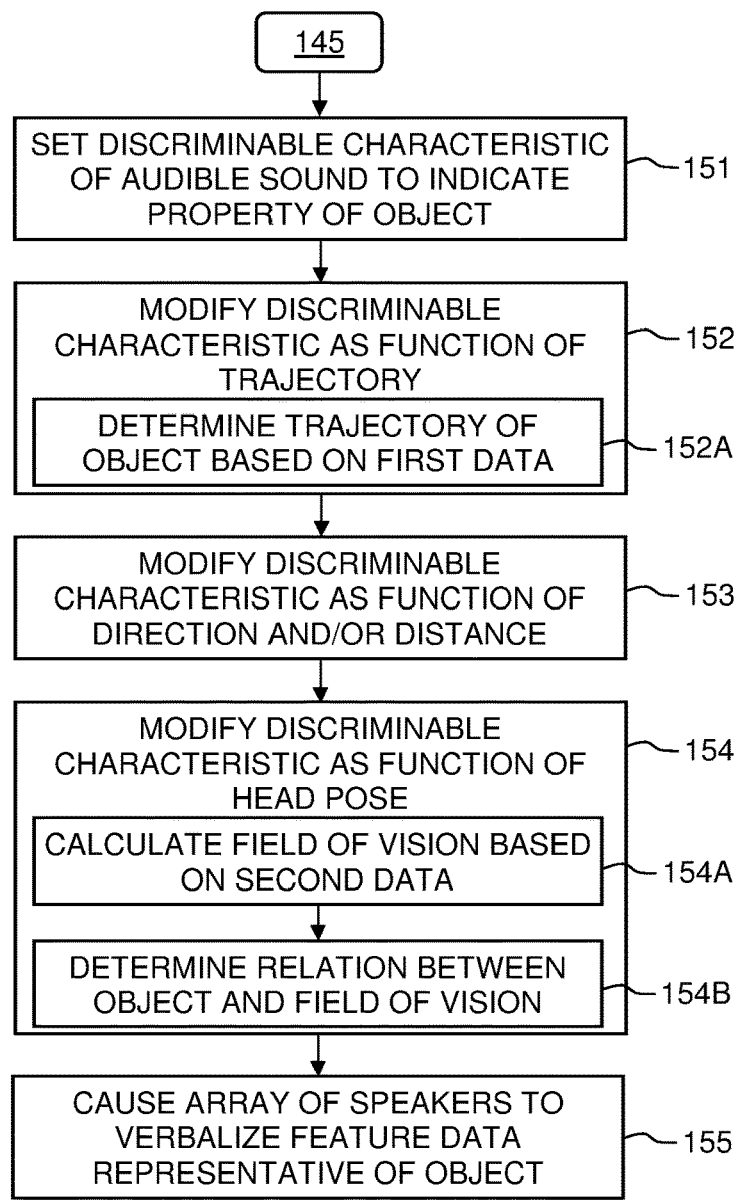

FIG. 7B is a flowchart of an example procedure that may be part of step 145 in the method 140. The procedure in FIG. 7B comprises steps 151-155, which are all optional and may be combined in any way. Common to the steps 151-154 is that the audible sound is generated with a discriminable characteristic that is indicative of the object. The characteristic is "discriminable" in the sense that it is audible and distinguishable from other sounds that may be generated inside the helmet by the speaker system (cf. 114 in FIG. 2). To the extent that the purpose of steps 151-154 is to convey information in addition to the position of the object, the discriminable characteristic is an audible property of the audible sound other than the spatial origin. For example, the audible property may be a frequency or combination of frequencies, a duration, a pattern of sound being on and off, a loudness, a timbre, etc., or any combination thereof.

In step 151, the discriminable characteristic is set to indicate a property of the detected object. In some embodiments, the discriminable characteristic is indicative of the object category, as determined by step 142B, and differs between different object categories. This allows the user to perceive both location and type of object from the audible sound. In some embodiments, the discriminable characteristic is indicative of whether the detected object is associated with a hazard or not, as determined by step 142C. This allows the user to perceive that there is a potential risk in the detection space and the location of the risk. In some embodiments, the discriminable characteristic is indicative of the hazard category, as determined by step 142D, and differs between different hazard categories. This allows the user to perceive that there is a potential risk in the detection space, as well as the degree and location of the risk.

Figure 8A:
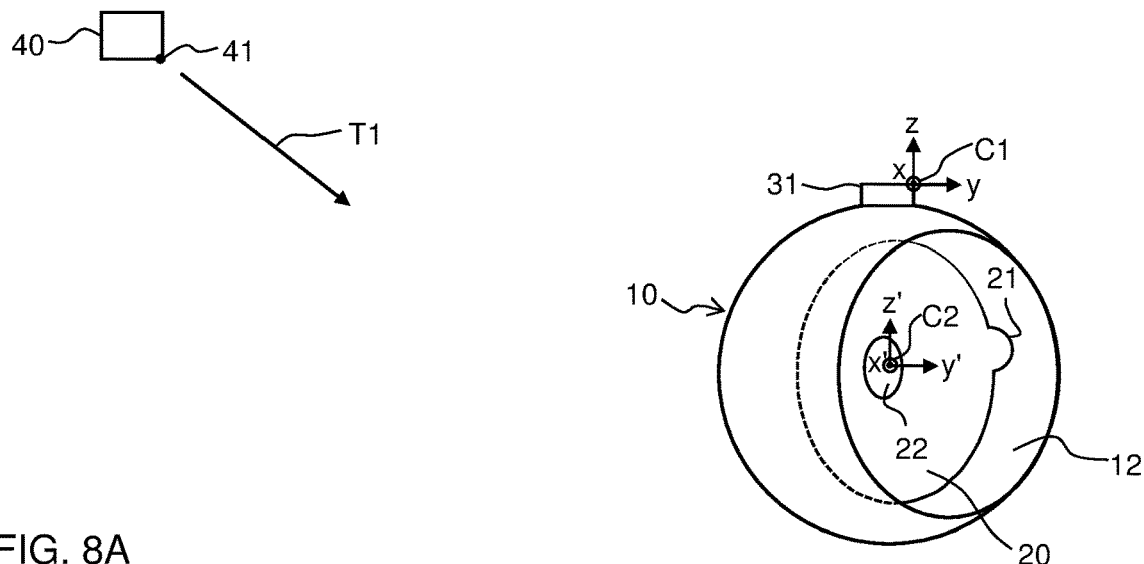
FIGS. 8A-8B illustrate example uses of the device for audio-based assistance.

In step 152, the discriminable characteristic is modified as a function of a trajectory of the object, assuming that the method 140 comprises a step 152A of determining the trajectory of the detected object based on the first data, ESD. Step 152A need not be part of step 152 but may be performed at any time after step 141, when the first data has been obtained. The trajectory is a time sequence of positions of the object, for example in the first coordinate system C1. The trajectory may be an actual trajectory followed by the object up until a current time point and/or an estimated future trajectory of the object. A future trajectory may be estimated in well-known manner, for example based on first positions, speed or acceleration. FIG. 8A illustrates a user who is facing away from an object 40, which is detected by the sensor 31 and found to be on a future trajectory T1. In some embodiments, step 152 may modify the discriminable characteristic to indicate whether an actual or future trajectory is directed towards or away from the user, or to indicate a likelihood that a future trajectory intersects a future trajectory of another detected object or intersects with the user. In another example, the discriminable characteristic is set to differ between different types of trajectories.

In step 153, the discriminable characteristic is modified as a function of a distance between the detected object and the user and/or a movement direction of the detected object in relation to the user. For example, the discriminable characteristic may be modified to increasingly capture the user's attention as the distance decreases. Similarly, the discriminable characteristic may be modified to increasingly capture the user's attention as the movement direction targets the body of the user.

In step 154, the discriminable characteristic is modified as a function of head pose, for example the orientation of the head relative to the helmet as given by the second data, HPD. The head pose is indicative of the user's focus. Generally, step 154 allows the discriminable characteristic to be adjusted based on the likelihood that the user is aware of the detected object. Thus, step 154 may be performed to direct the user's attention to objects that are unlikely to be visually detected by the user. Such objects may be hidden from view, by the helmet or by one or more other objects. Reverting to FIG. 8A, upon detecting that the user's head 20 is facing away from the object 40, and the array of speakers (not shown) in the helmet 10 may be caused to generate the audible sound with a discriminable characteristic that is specific to hidden objects or to objects located behind the user.

In some embodiments, the discriminable characteristic is modified in dependence of a relation between the detected object and the user's field of vision. The field of vision may be static or dynamic. A dynamic field of vision changes with head pose of the user, and a static field of vision is fixed and independent of head pose. As mentioned above, the field of vision may differ with head pose, for example if the field of vision is the available span of central vision through the visor 12 for each head pose, as indicated by IFV in FIGS. 3A-3B. As also mentioned above, the field of vision may be independent of head pose when also taking the user's peripheral vision into account.

In some embodiments, as exemplified in FIG. 7B, the method 140 may comprise a step 154A of calculating the user's field of vision through the visor 12 based on the second data, HPD, and a step 154B of determining the relation between the detected object 40 and the field of vision. Step 154A thereby determines a dynamic field of vision. Steps 154A-154B need not be part of step 154 but may be performed at any time after step 141, when the second data has been obtained. It is realized that steps 154A-154B may increase the diversity and/or improve the relevance of the audible feedback to the user.

In some embodiments, not illustrated in FIG. 7B, the field of vision is static and defined in relation to the helmet 10. Thereby, the relation between the detected object and the field of vision may be determined by evaluating the first position of the object in relation to a fixed definition of the field of view in the first coordinate system C1 (FIG. 6). Such embodiments may also increase the diversity and/or improve the relevance of the audible feedback to the user.

In some embodiments, which are applicable to both static and dynamic fields of vision, the audible sound is generated with different discriminable characteristics if the object is within or outside the field of vision. For example, the audible sound may be softer or entirely turned off if the object is within the field of vision. If the object is outside the field of vision, the audible sound may be generated to be more noticeable.

In step 155, the array of speakers 33 is caused to verbalize object data representative of the detected object. As used herein, "verbalize" infers that a message of one or more words is spoken. The use of verbalization may further improve the user's perception of objects or risks in the detection space. It may be noted that different subsets of the array of speakers may be activated for the verbalization and the generation of the spatialized sound. In some embodiments, the object data comprises a characterization of the detected object, for example an object class, a hazard class, a temperature, a composition, etc. In some embodiments, the object data comprises a distance to the detected object and/or a direction to the detected object. In some embodiments, the object data comprises a movement instruction to the user, for example a command to stop or move away.

It may be noted that at least some steps in the procedure of FIG. 7B may be implemented to warn the user about objects posing a risk to another user, who is located within the detection space of the user and thereby detected in step 142 (FIG. 5). The user may use regular audio communication, light signaling, etc., to warn the other user about the risk. For example, hazard detection and/or hazard classification in steps 142C, 142D (FIG. 7A) may be made for the other user as well. Thereby, in step 151, the audible sound may be generated with a discriminable characteristic indicating to the user that the other user is at risk, and optionally the type of risk. In another example, in step 152, the discriminable characteristic may be modified as a function of the trajectory in relation to the other user. In yet another example, in step 153, the discriminable characteristic may be modified as a function of the distance and/or movement direction in relation to the other user. In all examples, the audible sound may be generated with a spatial origin at the other user or the hazardous object, or both.

Figure 7C:
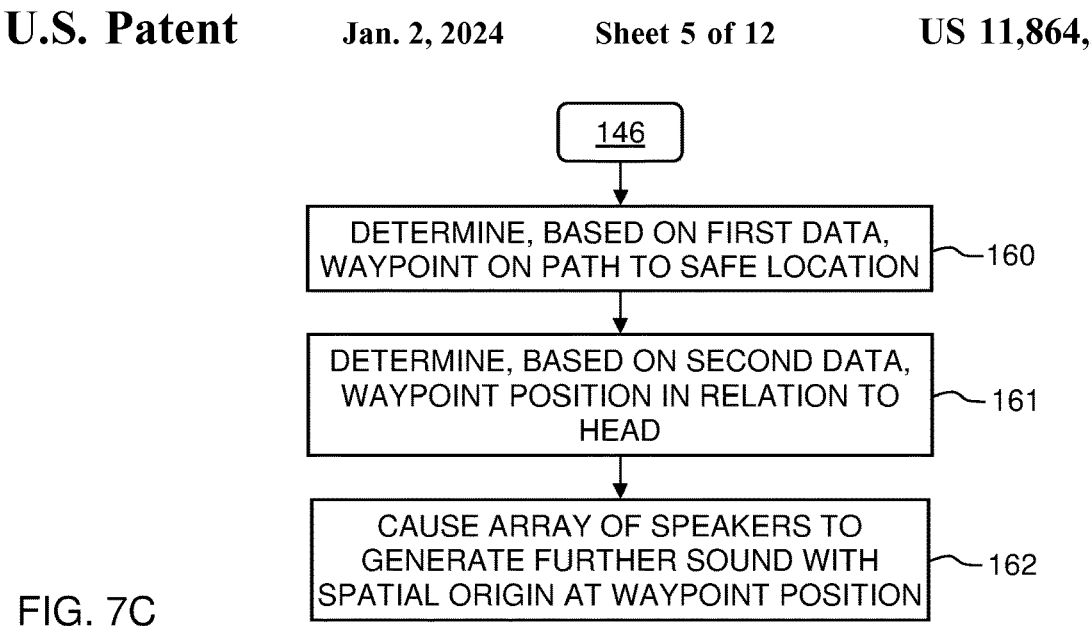
Figure 8B:
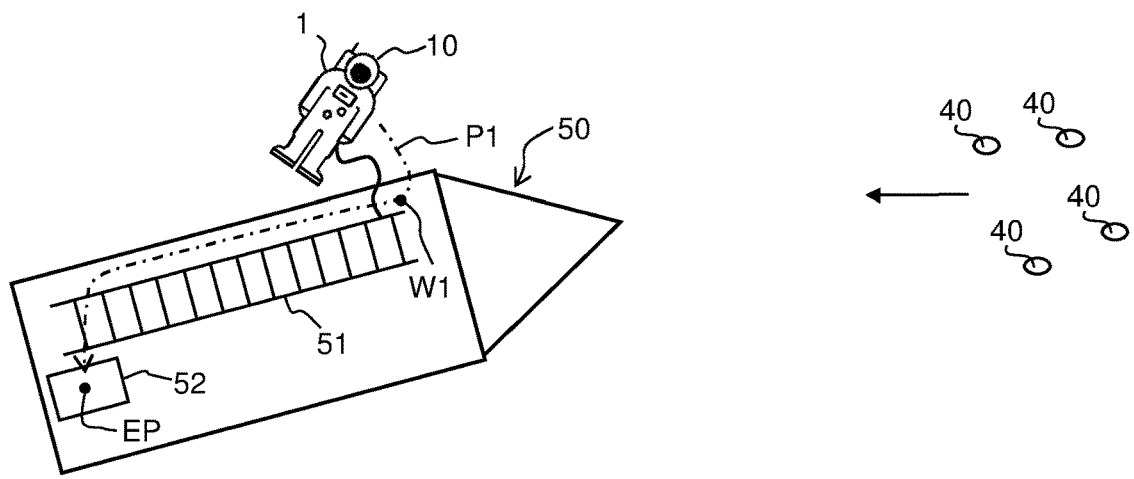

FIG. 7C is a flowchart of an example procedure 146 that may be included in the method 140, for example after step 145. The example procedure 146 is provided to guide the user along a path, for example in case of an emergency or during ground exploration. An example of an impending emergency is shown in FIG. 8B. Here, a user 1 performs a task in free space outside a spacecraft 50. The space suit comprises the device 120 (FIG. 4), which is operated to detect risks in the detection space around the user 1 and signal such risks by spatialized audible sound, and optionally by verbalization. In the illustrated example, the device 120 detects a swarm of meteoroids approaching the user 1. Upon detection of that the swarm poses a risk to the user, the device 120 may determine a path P1 for the individual 1 away from the area at risk of being hit by the swarm. The path P1 may be predefined or determined dynamically, for example based on the first data. Generally, the path P1 extends from a first location to a second location. In the illustrated example, the path P1 leads along a ladder 51 to a hatch 52 for entry into the spacecraft 50. Turning to FIG. 7C, the procedure 146 comprises steps 161-163. In step 161, a waypoint on the path P1 is determined based on the first data (ESD) obtained in step 141. The waypoint, which is represented as W1 in FIG. 8, is determined with respect to the helmet 10, by analogy with step 142. In step 162, a position of the waypoint W1 with respect to the head of the individual is determined based on the second data (HPD) obtained in step 141, by analogy with steps 143-144. In step 163, the array of speakers in the helmet 10 is caused to generate an audible sound with a spatial origin at or in the direction of the waypoint W1 with respect to the head, by analogy with step 145. Thereby, the user is guided by the audible sound along the path P1. It is also conceivable that the array of speakers is caused to verbalize the path P1 in step 163.

One advantage of some embodiments described in the foregoing is that obstacles and hazards outside the user's field of vision are presented through audio, allowing the user to simultaneously process visual information within the user's field of vision. In comparison, an AR system in unable to indicate the position of objects outside the user's field of vision. Thus, embodiments described herein may replace or supplement an AR system.

Another advantage of some embodiments is that the user is guided to safety if vision is lost, for example if the user is blinded or the helmet visor is compromised.

Further, some embodiments enable the user to be informed about characteristics that are imperceptible to the human eye. For example, some embodiments may help the user to distinguish between hot and cold objects.

In the following, clauses are recited to summarize some aspects and embodiments as disclosed in the foregoing.

C1. A device for assisting an individual during extravehicular activity, said device comprising: a first input (120A) for first data (ESD) indicative of a detection space around the individual; a second input (120B) for second data (HPD) indicative of a pose of the head (20) of the individual relative to a helmet (10), which is worn over the head (20) of the individual with spacing to allow the head (20) to move inside the helmet (10); and processor circuitry (101) configured to: obtain the first data (ESD) on the first input (120A); obtain the second data (HPD) on the second input (120B); process the first data (ESD) to detect an object (40) of relevance to the individual in the detection space and determine a first position of the object (40) with respect to the helmet (10); determine, based on the first position and the second data (HPD), a second position of the object (40) with respect to the head (20), and cause an array of speakers (33) in the helmet (10) to generate an audible sound inside the helmet (30) with a spatial origin given by the second position.

C2. The device of C1, wherein the processor circuitry (101) is configured to cause the array of speakers (33) to generate the audible sound with a discriminable characteristic that is indicative of the object (40).

C3. The device of C2, wherein the discriminable characteristic is an audible property of the audible sound other than the spatial origin.

C4. The device of C2 or C3, wherein the processor circuitry (101) is configured to process the first data (ESD) for detection of a hazard associated with the object (40), and wherein the discriminable characteristic is indicative of the hazard.

C5. The device of C4, wherein the processor circuitry (101) is further configured to process the first data (ESD) for classification of the hazard into a hazard category among a plurality of a hazard categories, wherein the discriminable characteristic is indicative of the hazard category and differs between the hazard categories.

C6. The device of any one of C2-C5, wherein the processor circuitry (101) is configured to process the first data (ESD) for classification of the object (40) into an object category among a plurality of object categories, wherein the discriminable characteristic is indicative of the object category and differs between the object categories.

C7. The device of any one of C2-C6, wherein the processor circuitry (101) is configured to modify the discriminable characteristic as a function of a distance between the object (40) and the individual or another individual in the detection space and/or a movement direction of the object (40) in relation to the individual or said another individual in the detection space.

C8. The device of any one of C2-C7, wherein the processor circuitry (101) is configured to modify the discriminable characteristic as a function of the pose of the head.

C9. The device of any one of C2-C8, wherein the processor circuitry (101) is configured to modify the discriminable characteristic in dependence of a relation between the object (40) and a field of vision of the individual.

C10. The device of C9, wherein the processor circuitry (101) is configured to calculate the field of vision of the individual through a visor (12) of the helmet (10) based on the second data (HPD), and determine the relation between the object (40) and the field of vision.

C11. The device of C9 or C10, wherein the processor circuitry (101) is configured to generate the audible sound with different discriminable characteristics if the object (40) is within or outside the field of vision.

C12. The device of any one of C2-C11, wherein the processor circuitry (101) is configured to estimate, based on the first data, a trajectory (T1) of the object, and to modify the discriminable characteristic as a function of the trajectory (T1).

C13. The device of any preceding clause, wherein the processor circuitry (101) is configured to determine, based on the first data (ESD), a waypoint (W1) with respect to the helmet (10) on a path (P1) from a first location of the individual to a second location (EP), determine a position of the waypoint (W1) with respect to the head based on the second data (HPD), and generate a further audible sound with a spatial origin given by the position of the waypoint (W1) with respect to the head.

C14. The device of C13, wherein the processor circuitry (101) is further configured to cause the array of speakers (33) to verbalize the path (P1).

C15. The device of any preceding clause, wherein the processor circuitry (101) is configured to cause the array of speakers (33) to verbalize object data representative of the object (40).

C16. The device of C15, wherein the object data comprises one or more of: a characterization of the object (40), a distance to the object (40), a direction to the object (40), or a movement instruction to the individual.

C17. The device of any preceding clause, further comprising at least one of the helmet (10), the array of speakers (33), a sensor arrangement (108; 31) configured to generate the first data, or a head tracking device (32) configured to generate the second data.

C18. The device of C17, wherein the sensor arrangement (108; 31) is configured to detect one or more of a shape, a distance, a temperature, or a composition.

C19. A space suit for extravehicular activity, said space suit (2) comprising a device according to any preceding clause.

C20. A computer-implemented method for assisting an individual that wears a helmet during extravehicular activity, the helmet allowing the individual to move its head within the helmet, said computer-implemented method comprising: obtaining (141) first data indicative of a detection space around the individual; obtaining (141) second data indicative of a pose of the head of the individual relative to the helmet; detecting (142), based on the first data, an object of relevance to the individual in the detection space; determining (143), based on the first data, a first position of the object with respect to the helmet; determining (144), based on the first position and the second data, a second position of the object with respect to the head; and causing (145) an array of speakers in the helmet to generate an audible sound with a spatial origin given by the second position.

C21. A computer-readable medium comprising instructions which, when installed on a processor (401), causes the processor (401) to perform the method of C20.

2. Performance-Based Feedback During Activity in a Low-Gravity Environment

This part of the disclosure relates to a technique of providing performance support in a low-gravity environment to improve the perception of how a task is performed by a user in the low-gravity environment. This part of the disclosure is particularly, but not exclusively, related to an inventive concept of evaluating measured body poses and gaze directions of the user for detection of deviations in the performance of the task by the user and providing related feedback to the user or to another user. The inventive concept may be implemented to provide the feedback in real-time to the user that performs the task, thereby allowing the user to instantly correct any deviations. Alternatively, the feedback may be provided to the user after task completion, so that the user is made aware of the deviations and can take corrective measures next time the task is performed. Alternatively or additionally, the feedback may be provided to another user. Real-time feedback allows the other user to provide corrective instructions in real-time to the user. In some embodiments, the low-gravity environment is extraterrestrial and the activity an EVA. In other embodiments, the inventive concept is applied in preparation of EVA, for example during rehearsal of tasks in a low-gravity environment on Earth. In both cases, the inventive concept has the technical effect of reducing the risk that the user inadvertently deviates from a rehearsed movement during EVA. Depending on implementation, the feedback may be audible/visual or in another format.

Figure 9:
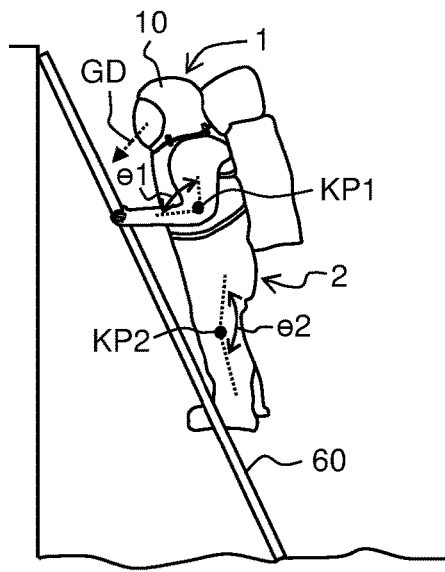
FIG. 9 is a side view of an individual dressed in a space suit performing an example task.

FIG. 9 illustrates an individual or user 1 that performs a task in space, or in a low-gravity environment in preparation of a space mission. Here, the task is climbing down or up a ladder 160. It is to be noted that the term "task" is broadly referring to any sequence of actions that are predefined to be performed by an individual in a low-gravity environment. Other non-limiting examples of tasks include climbing out of or into a hatch, entering or leaving a vehicle, jumping, lifting, performing repair or service of different types, etc. The task may be predefined in terms of body pose and gaze direction for the different actions included in the task.

In FIG. 9, the gaze direction is represented by an arrow GD, and the body pose is represented by two body angles θ1, θ2, which are defined between limbs that meet at a joint or "keypoint" KP1, KP2. It is realized that the body pose, depending on the task, may be defined by a set of body angles, and that the set of body angles may differ between tasks, for example depending on the limbs that are relevant to the task. The gaze direction may be given in relation to the space suit 2, for example the helmet 10. In some embodiments, the gaze direction is defined by a set of gaze angles in relation to a coordinate system associated with the space suit 2, for example azimuth and elevation angles.

The task of descending the ladder 160 may be defined to include several actions or movements, such as "lift right foot from step", "lower right leg", "place right foot on step", "lift left foot from step", "lower left leg" and "place left foot on step". These actions may be repeated during the task and may take any time to perform. The task is associated with a nominal performance scheme, NPS, which defines allowable body poses and gaze directions that are to be attained by the individual when performing the task. As will be described below, the NPS may take different forms and is used for evaluating if the individual performs the task with or without deviations.

Figure 10:
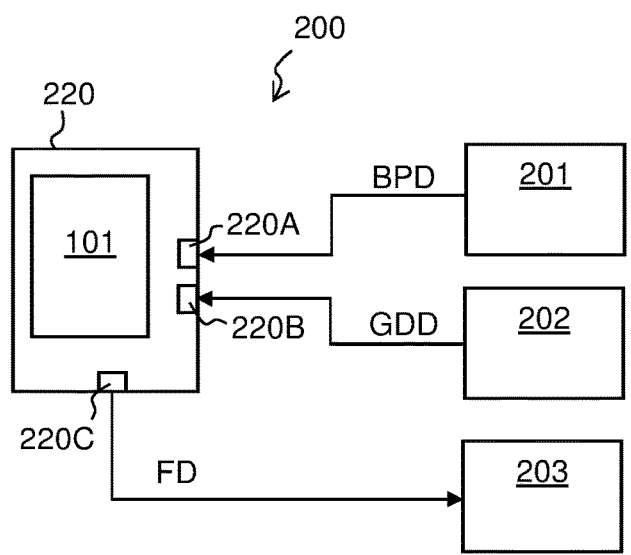
FIG. 10 is a block diagram of an example device for providing performance-related feedback to an individual in relation to a task performed by the individual.

FIG. 10 shows a device 220 which is configured to provide performance support in a low-gravity environment in accordance with the inventive concept. The device 220 is part of a system 200, which also includes a first measurement arrangement 201, a second measurement arrangement 202, and a feedback device 203. The first measurement arrangement 201 is configured to generate first data indicative of the body pose of a user. The first data is denoted body pose data, BPD, in the following. The first measurement arrangement 201 may comprise one or more body pose sensors, for example as discussed with reference to the sensor arrangement 107 in FIG. 2. The second measurement arrangement 202 is configured to generate second data indicative of the gaze direction of the user. The second data is denoted gaze direction data, GDD, in the following. The second measurement arrangement 202 may comprise a gaze tracking device. Alternatively, gaze direction may be approximated by the orientation of the user's head. Thus, in some embodiments, the second measurement arrangement 202 comprises a head tracking device, and the GDD is the output of the head tracking device (cf. HPD in Chapter 1 and Chapter 3). The gaze or head tracking device may be configured as discussed with reference to the sensor arrangement 107 in FIG. 2. The feedback device 203 is configured to present feedback based on feedback data, FD, provided by the device 220. The feedback may be presented in visual and/or audible form. Audible feedback data may be presented in verbalized form or as dedicated signals indicative of a detected deviation. Visual feedback data may, for example, be presented to indicate the location and magnitude of a detected deviation on a graphic representation of the user and/or to show the performed movement in relation to an ideal movement. The feedback may also comprise one or more calculated metrics related to the user's performance of the task.

As an alternative or supplement to visual and audible feedback, any other form of feedback may be presented by the feedback device 203. For example, haptic feedback may be given through actuators attached to limbs or body parts of the user. The haptic feedback may be given by applying forces, vibrations or motions to the user. The haptic feedback may be given to indicate the location and magnitude of the deviation. In some embodiments, the actuators may be operated to provide the feedback by inhibiting or counteracting the motion of a limb or body part found to deviate. This type of haptic feedback may be seen as a "force feedback". It is to be understood that "present feedback" is used herein to broadly cover any way of conveying feedback to an individual.

As understood from the foregoing, the feedback device 203 may be arranged to present the feedback to the user that performs the task and may thus be arranged in the space suit 2. Such a feedback device 203 may comprise the display device 115 and/or the speaker system 114 in FIG. 2, and/or the above-mentioned actuators. Alternatively, the feedback device 203 may be arranged to present the feedback to another user, who may be in another space suit, in a spacecraft, a mission control center, a training facility, etc. Such a feedback device 203 may comprise a display device and/or a speaker system of any suitable type.

The device 220 comprises processor circuitry 101, which may correspond to the control device 101 in FIG. 2, a first input device 220A configured to receive the BPD from the first measurement arrangement 201, and a second input device 220B configured to receive the GDD from the second measurement arrangement 202. The input devices 220A, 220B ("inputs") may comprise any conventional hardware interface, optionally combined with software, for receiving input signals. The device 220 further comprises an output device 220C ("output") configured to provide FD to the feedback device 203.

The device 220 in FIG. 10 may be included in the space suit 2, for example by manufacture or retrofitting. The device 220 may be a unitary component or an assembly of separate parts. It is also conceivable that the device 220 includes one or more additional components of the system 200, for example the first measurement arrangement 201, the second measurement arrangement 202, or the feedback device 203.

Figure 11:
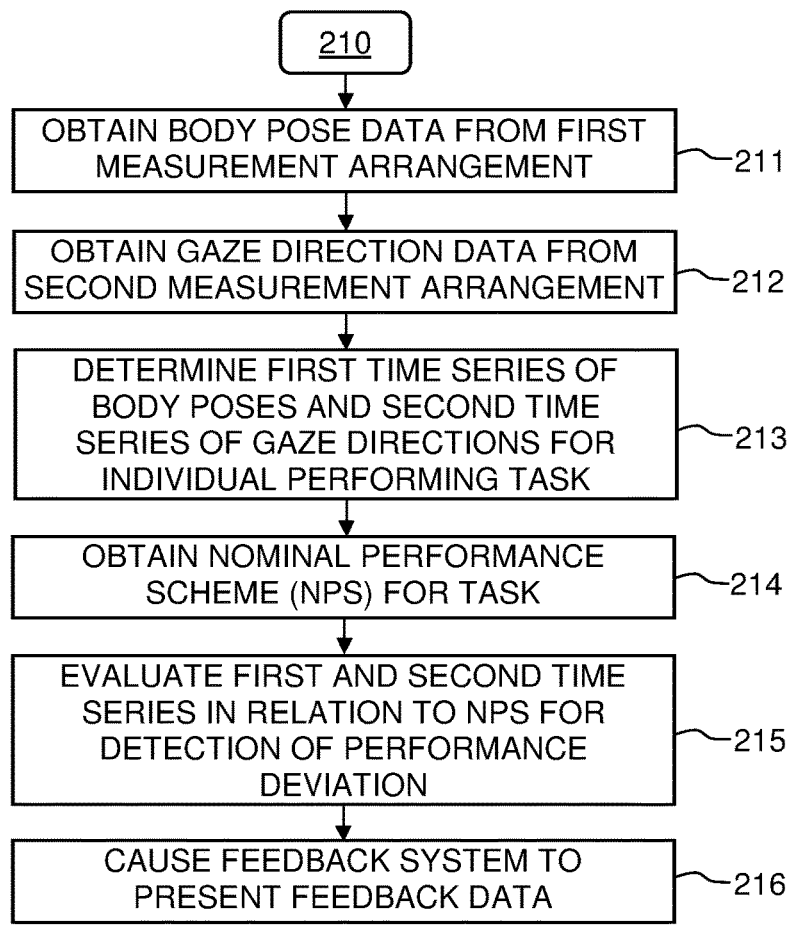
FIG. 11 is a flow chart of an example method of providing performance-related feedback.

FIG. 11 is a flowchart of an example method 210 of providing performance support in a low-gravity environment. The method 210 is computer-implemented and may be performed by the device 220 in FIG. 10. The method 210 may be implemented by hardware or a combination of hardware and software, for example by program instructions stored in a memory in the device 220.

In step 211, BPD is obtained via the first input 220A. Depending on implementation, the BPD may include raw sensor data from sensor(s) in the first measurement arrangement 201, pre-processed data, or data representative of the body pose, such as a first set of body angles.

In step 212, GDD is obtained via the second input 220B. Depending on implementation, the GDD may include raw sensor data from sensor(s) in the second measurement arrangement 202, pre-processed data, or data representative of the gaze direction, such as a second set of gaze angles.

In step 213, a first time series of body poses is determined based on the BPD, and second time series of gaze directions are determined based on the GDD. The first and second time series are determined to represent the individual while performing a task. Depending on the content and format of BPD and GDD, step 213 may comprise reading data representative of body pose and/or gaze direction from BPD and/or GDD, or processing BPD and/or GDD for determination of such data.

The first time series comprises a time sequence of body poses and represents the momentary body pose at different time points over a first time period. Correspondingly, the second time series comprises a time sequence of gaze directions and represents the momentary gaze direction at different time points over a second time period. The first and second time periods may or may not be overlapping, and the time points in the first and second time series may or may not coincide. In some embodiments, however, the first and second time series are coordinated so that there is an approximate temporal match between body poses and gaze directions.

In step 214, the above-mentioned nominal performance scheme, NPS, is obtained. The NPS may be obtained from a memory in the device 220, or from another storage device in the system 200. In some embodiments, the NPS is specific to a task and may be obtained based on a task identification performed in step 213. In some embodiments, the NPS defines an ideal sequence of body poses and gaze directions to be attained during performance of a respective task. Another format of the NPS will be described below with reference to FIGS. 12-13. The NPS may also define allowable deviations for the body poses and gaze directions, and the allowable deviations may differ between different stages of the task. Further, the allowable deviations may differ between different parts of the body pose, for example between different body angles.

In step 215, the first and second time series are evaluated in relation to the NPS for detection of a performance deviation. The implementation of step 215 depends on the format of the NPS, and also on the required time response of the method 210 to provide the FD, but may be seen to involve a comparison between a respective body pose in the first time series to a corresponding body pose defined by the NPS, and a comparison of a respective gaze direction in the second time series to a corresponding gaze direction defined by the NPS, and a combining of the results from the respective comparison.

In step 216, the FD is generated to be representative of the outcome of the evaluation in step 215, and output for presentation by the feedback device 203. In some embodiments, step 216 comprises generating control signals for operating the feedback device 203. In other embodiments, step 216 comprises transmitting the FD in a format adapted to the feedback device 203. In yet other embodiments, step 216 comprises transmitting the FD to the feedback device, which independently generates the appropriate control signals.

If the method 210 is performed to provide the FD after completion of the task, processing efficiency may be less of an issue and the method 210 may be implemented to consume any amount of memory resources and processing capacity of the device 220. On the other hand, if the method 201 is performed to provide the FD in real-time, processing and power efficiency may be of essence. Further, for real-time feedback, the method 210 has to be implemented to produce the results of the evaluation in step 215 in synchronization with the progression of the task.

Figure 12:
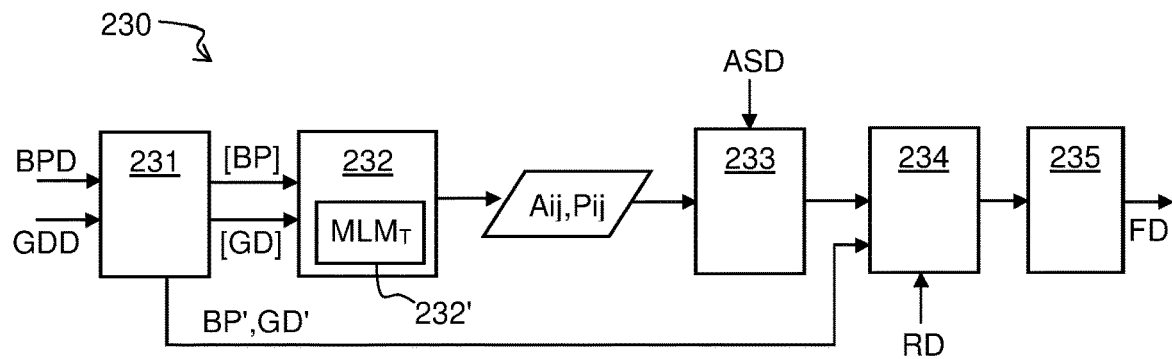
FIG. 12 is a block diagram of an example processing system for performing the method of FIG. 11.

FIG. 12 is a block diagram of an example processing system 230 which is configured to implement the method 210 and is operable to provide real-time feedback. However, the processing system 230 may also be operated to provide feedback after task completion. The processing system 230 may be included in the device 220, for example as part of the processor circuitry 101. The processing system 230 comprises blocks or modules 231-235.

Module 231 implements step 213 (FIG. 11) and is configured to receive the BPD and GDD and repeatedly generate the first and second time series for a predefined time period or time window which is a subset of the total time required to perform the task. The time window may also be smaller than the duration of a respective action included in the task. The length of the time window is a compromise between processing efficiency and performance and may be determined by testing or modeling. For example, the time window may be set in the range of 10 ms-10 s, or in the range of 100 ms-5 s. Consecutive time windows may be overlapping or non-overlapping. The resulting first and second time series are designated [BP] and [GD] in FIG. 12. As shown in FIG. 12, module 231 may also output a momentary body pose, BP', and a momentary gaze direction, GD', for use by module 234, as described below.

Module 232 implements part of step 215 (FIG. 11) and is configured to receive and process the first and second times series, [BP], [GD] for determination of action data. The action data comprises at least one predefined action Aij and optionally an associated probability Pij. As shown, module 232 may comprise a trained machine learning-based module 232' ($MLM_T$) which is configured to map incoming [BP], [GD] to predefined actions that may be part of the tasks to be performed by the user. The $MLM_T$ 232' may be a conventional activity recognition algorithm and may utilize a neural network for action classification. Depending on implementation, as is well-known to the skilled person, the $MLM_T$ 232' may output a single action, optionally together with probability value, or a plurality of actions and a probability value of each action. The respective probability value represents the likelihood that the input data [BP], [GD] corresponds to the associated action.

Module 233 implements part of step 215 and is configured to evaluate the at least one action Aij and/or the at least one probability Pij from module 232 in relation to a validation criterion, which is based on the NPS. In the illustrated example, the NPS comprises an action sequence definition, ASD, which is used to define the validation criterion. Examples of validation criteria and use of ASD will be described below with reference to FIGS. 13A-13B. Module 233 is further configured to selectively, if the validation criterion is violated, activate module 234.

Module 234 implements part of step 215 and is configured to perform a deviation analysis in relation to reference data, RD, included in the NPS. In some embodiments, the deviation analysis comprises evaluating a momentary body pose (BP') and/or a momentary gaze direction (GD'), provided by module 231, in relation to the RD. Module 234 may be configured to obtain BP' and/or GD' from module 231 on demand. Examples of the deviation analysis and RD are given below with reference to FIG. 13C and FIGS. 14B-14C.

Module 235 implements step 216 and is configured to generate FD based on the outcome of the deviation analysis performed by module 234.

It should be noted that modules 232, 233 are operated to repeatedly generate and evaluate [BP], [GC] at consecutive time points, that module 234 is operated to perform the deviation analysis when motivated by the action data, and that module 235 is operated to generate the FD based on the outcome of the deviation analysis. Thereby, it is possible to generate real-time feedback. Further, the deviation analysis is only performed when the validation criterion is violated, which will improve processing and power efficiency.

Figure 13A:
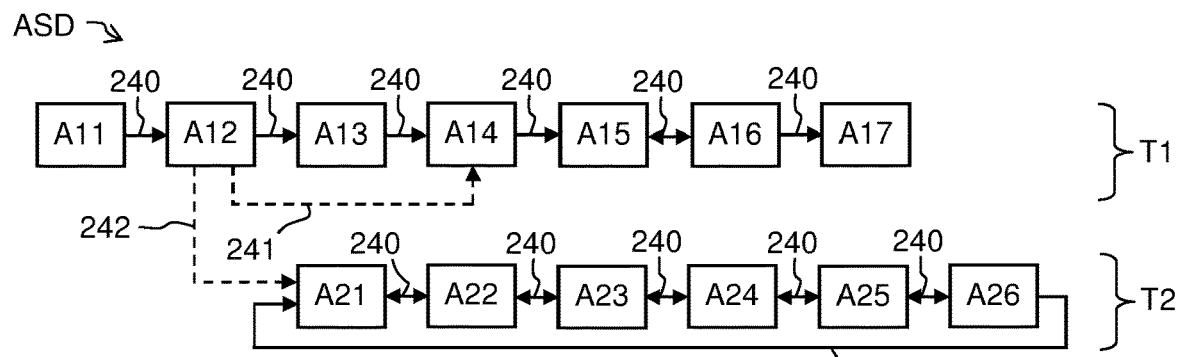
FIG. 13A is a schematic illustration of an activity sequence definition used by the processing system in FIG. 12, and FIGS. 13B-13D are flow charts of example procedures in the method of FIG. 11.
Figure 13B:
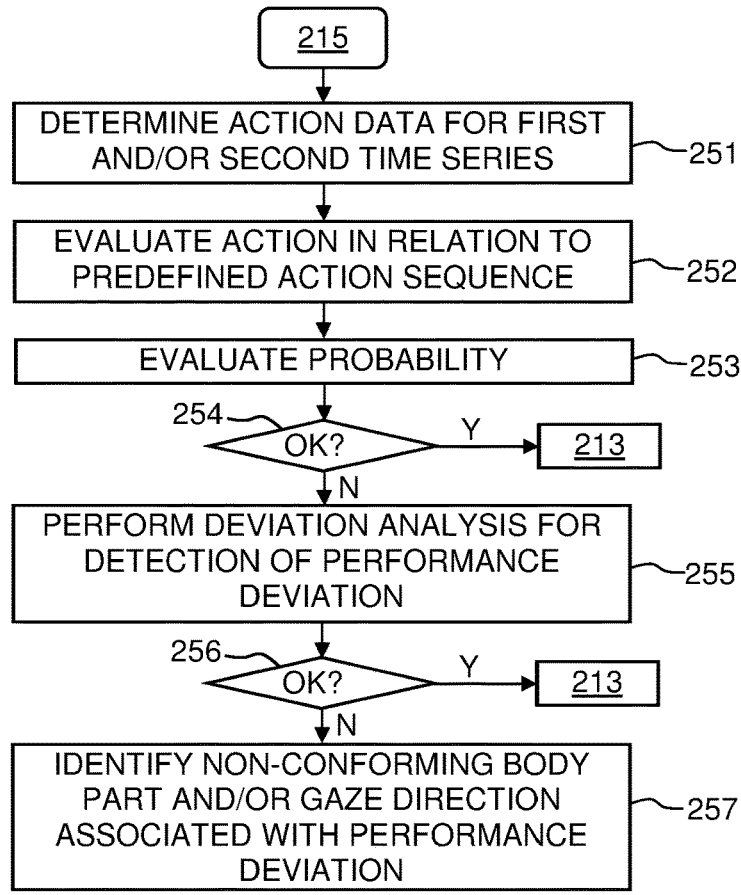

FIG. 13B is a flow chart of an example procedure that may be part of evaluation step 215 (FIG. 11). The example procedure in FIG. 13B may be performed by the processing system 230 in FIG. 12.

In step 251, which may be performed by module 232, action data is determined for the first time series [BP] and/or the second time series [GD]. Thus, although module 232 is illustrated in FIG. 12 to receive both [BP] and [GD], it is conceivable that the action data is determined based on either [BP] or [GD].

Step 252 may be performed by module 233 and comprises an evaluation of the one or more actions Aij in the action data in relation to a validation criterion, which is based on the action sequence definition, ASD. The ASD is predefined and defines allowable actions to be performed by the user within a task and the allowable sequencing or ordering of the allowable actions. A graphical example of an ASD is shown in FIG. 13A. In the illustrated example, the ASD defines actions for two tasks T1, T2. Task T1 comprises allowable actions A11-A17, and task T2 comprises allowable actions A21-A26. Solid arrows 240 indicate allowable switches between consecutive actions of a task, dashed arrow 241 indicates an allowed jump to skip one or more actions of a task, and dashed arrow 242 indicates an allowed jump from an action in one task to an action in another task. The ASD thus defines a predefined sequence of actions for one or more tasks. However, as seen, the ASD is not limited to a linear sequence of actions, but may incorporate loops, forward and backwards steps, and skipping jumps both between actions within a task and between tasks. The ASD may be seen as a graph, which is defined by actions and links between actions, with the links defining one or more actions ("expected actions") to follow upon the respective action at the next time step. It is to be noted that, although not shown in FIG. 13A, it may be allowed for each action to be followed by the same action. This will make the evaluation in step 251 independent of how fast the user performs the task.

In one example, T2 is the task of climbing the ladder 160 in FIG. 9, and A21-A26 represent the above-mentioned actions: "lift right foot from step" (A21), "lower right leg" (A22), "place right foot on step" (A23), "lift left foot from step" (A24), "lower left leg" (A25), and "place left foot on step" (A26). The ASD in FIG. 13A allows the user to repeat A21-A26 and allows transitions back and forth between adjacent actions.

In some embodiments of step 252, the validation criterion is violated if an evaluated action in the action data from step 252 deviates from the expected action(s) according to the ASD. An expected action is identified in the ASD in relation to the evaluated action in a preceding execution of step 252, for example the last execution. If the action data includes a single action, the evaluated action is the single action. If the action data includes plural actions, the evaluated action may be the action that is associated with the highest probability. It is also conceivable that there are plural evaluated actions, which may be all actions in the action data that have a probability above a probability limit.

Figure 14A:
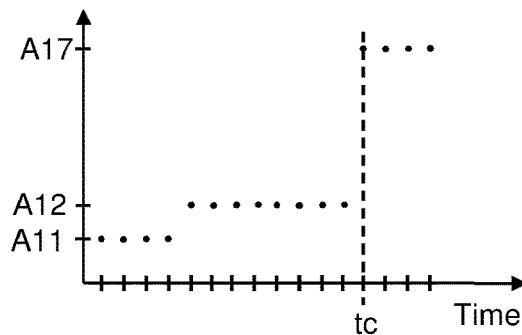
FIG. 14A is a graph of example actions determined by the procedure in FIG. 13B, and FIGS. 14B-14C are graphs of time-resolved body pose and gaze direction during a predefined time window in accordance with an example.

An example of the validation by step 252 is shown in FIG. 14A. Here, each dot represents an action determined by step 251 and evaluated by step 252 at consecutive time steps, i.e. for consecutive time series [BP], [GD]. As seen, the user is deemed to perform A11 for a number of time steps and then the user appears to switch to A12, which is allowed according to the ASD in FIG. 13A. At time point tc, the user appears to switch to action A17, which is not allowed according to the ASD in FIG. 13A. Thus, at time tc, step 252 will detect a violation of the validation criterion.

Step 253 may also be performed by module 233 and may supplement or replace step 252. Step 253 comprises an evaluation of one or more probability values Pij in the action data in relation to a validation criterion. If the action comprises plural probability values, the maximum probability value is evaluated. For example, the validation criterion may be violated if the probability is below a reference value, which may be given by the NPS.

In step 254, which may be performed by module 233, the outcome of step 252 and/or step 253 is evaluated. Depending on implementation, step 254 may detect a need for deviation analysis if a violation is determined by at least one of steps 252, 253 (OR criterion), or by both steps 252, 253 (AND criterion). If a need for deviation analysis is determined, the procedure continues to step 255. Otherwise, the procedure may proceed to step 213, which determines new first and second time series. Alternatively, the procedure may proceed to step 216 and cause the feedback device 203 to indicate absence of deviations.

Step 255 may be performed by module 234 and comprises the above-mentioned deviation analysis in relation to the above-mentioned reference data, RD, for detection of performance deviation(s).

If a performance deviation is detected in step 255, step 256 directs the procedure to step 257. Otherwise, the step 256 directs the procedure to step 213, which determines new first and second time series. Alternatively, step 256 may direct the procedure step 216, which may cause the feedback device 203 to indicate an absence of deviations.

In step 257, which may be performed by module 234, the origin of the performance deviation(s) is identified, in the form of one or more non-conforming body parts and/or a non-conforming gaze direction. Step 257 may also quantify the performance deviation, by calculating one or more metrics based on the outcome of the deviation analysis in step 255. The output of step 257 may then be included in the FD by step 216.

Figure 13C:
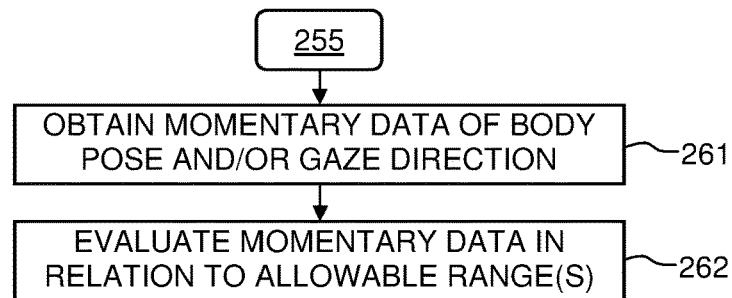

FIG. 13C is a flow chart of an example procedure that may be part of the deviation analysis in step 255 of FIG. 13B. As understood from FIG. 13B, step 255 is performed at a specific time point, subject to detection of violation(s) by steps 252-253. In the example of FIG. 14A, this time point corresponds to time tc.

The example procedure in FIG. 13C presumes that the reference data RD associates a respective action in the ASD with one or more allowable ranges for body pose and/or gaze direction. Thus, RD may define one or more allowable ranges for the gaze direction, for example an allowable elevation angle range and/or an allowable azimuth angle range. Alternatively or additionally, the RD may define one or more allowable ranges for the body pose, for example an allowable orientation range for each body part deemed to be of relevance to the action. In some embodiments, RD may define a body angle range for each joint or keypoint (cf. FIG. 9) deemed to be of relevance to the action. It should be noted that the allowable range may differ between joints.

Step 261 obtains momentary data of body pose and/or gaze direction at the time point when the violation is detected. This corresponds to module 234 being operated to retrieve BP', GD' from module 231 in FIG. 12.

Step 262 comprises evaluating the momentary data in relation to the corresponding allowable range(s) given by RD. A performance deviation may be detected if the momentary data falls outside one or more allowable ranges. Step 262 may select the allowable range(s) to be used in the evaluation from RD. In some embodiments, each such allowable range is given by the last action that was performed by the user before the violation was identified, i.e. the latest non-violated action. With reference to FIG. 14A, step 262 would select the allowable range(s) is extracted for action A12 in RD.

It should be realized that the example procedure in FIG. 13C provides a processing efficient technique for detecting performance deviations.

Figure 14B:
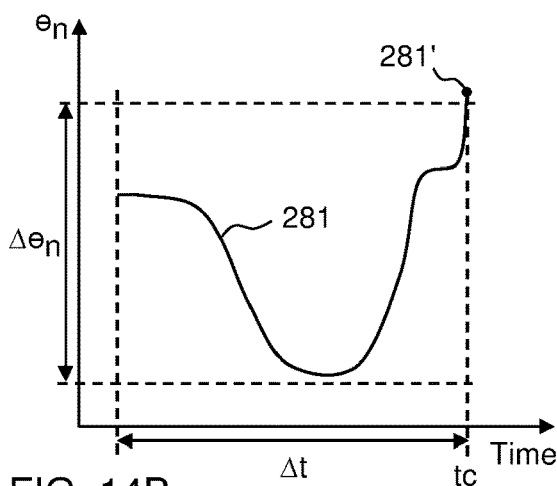
Figure 14C:
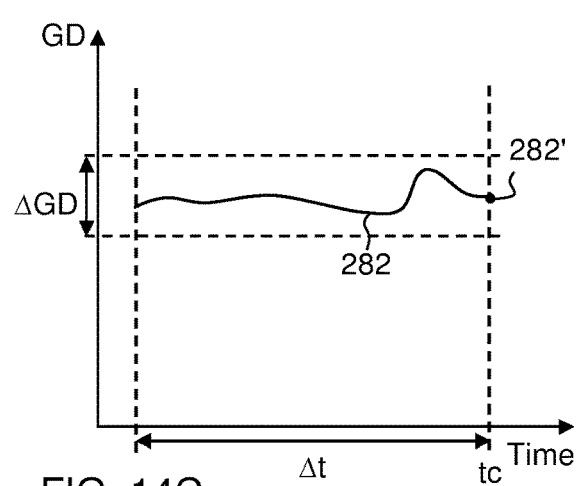

FIG. 14B is a graph of a body angle $\theta n$ as a function of time, and FIG. 14C is a corresponding graph of gaze direction as a function of time. The curve 281 is included in a first time series, [BP], and the curve 281 is included in a second time series, [GD], and $\Delta t$ represents the above-mentioned time window. Further, $\Delta \theta n$ represents the allowable range of the body angle $\theta n$, and $\Delta GD$ represents the allowable range of the gaze direction. Further, 281' designates the momentary body angle when the violation is detected at time point tc, and 282' designates the momentary gaze direction at time point tc. As seen in FIG. 14B, the momentary body angle 281' falls outside $\Delta \theta n$, which will cause step 262 to identify a performance deviation for body angle $\theta n$. On the other hand, as seen in FIG. 14C, since the momentary gaze direction 282' falls within $\Delta GD$, no performance deviation will be identified for the gaze direction GD.

The allowable ranges may be set based on a theoretical model of the movement pattern of an individual wearing a space suit in a low-gravity environment. It is also conceivable to calculate the allowable ranges from BPD and GDD that are measured for one or more individuals when performing a respective action, preferably a large number of times and under well-controlled conditions. For example, the allowable range for a parameter may be calculated as a function of the measured values of the parameter, for example to represent the dispersion of the measured values. For example, the allowable range may be given as function of the standard deviation or the interquartile range of the measured values. It should be realized that the device 220 may be used for collecting the measured values by minor modification, for example by including a storage/calculation function that is activated when the device 220 is set in a calibration mode. For example, the processing system 230 in FIG. 12 may be supplemented by a storage module, which is operable to jointly store associated samples of input data and output data of module 232, for example [BP] and/or [GD] and a resulting action. Alternatively or additionally, the processing system 230 may be supplemented by a calculation module configured to calculate and set the allowable ranges based on the associated samples of input data and output data of module 232.

Figure 13D:
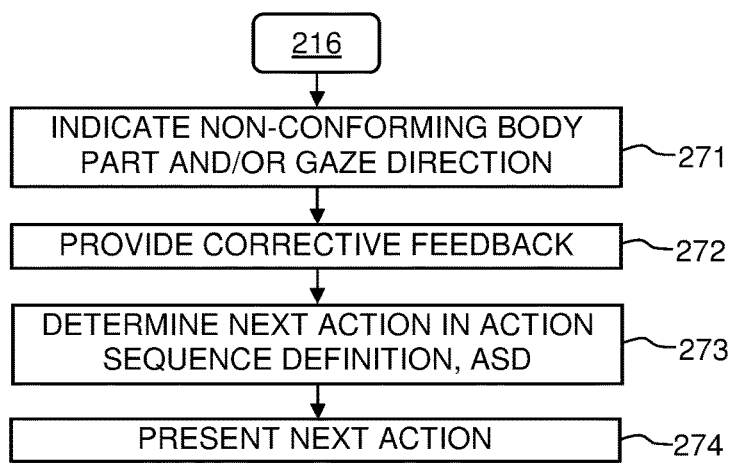

FIG. 13D is a flow chart of a procedure that may be part of step 216 (FIG. 11). The procedure may comprise all of steps 271-274, or any one of step 271, step 272 or steps 273-274.

Step 271 comprises including an indicator, in the FD, of the non-confirming body part and/or non-conforming gaze direction, for example as identified in step 257. Step 272 comprises providing corrective feedback as part of the FD. The corrective feedback may include instructions on corrective measures to be taken by the user to remedy the performance deviation(s). Step 271 and/or step 272 will help the user to adhere to the NPS.

Step 273 comprises identifying or determining a next action for the user to perform. The next action is identified is the ASD as a subsequent action in relation to a current non-violated action. For example, the next action may be given by a solid arrow in the example of FIG. 13A and may correspond to the most plausible action to be taken by the user after a current action. In step 274, the feedback device 203 is caused to present the next action. The combination of steps 273-274 will guide the user to perform the actions of a task in a predefined order.

One advantage of some embodiments described in the foregoing is that the user may be warned whenever the user performs incorrect movements as part of a task.

Another advantage of some embodiments is that the user may be given support and advice on what movement and/or part of movement is wrong and how to correct it.

Further, the technique described herein may be used during training or rehearsal to verify if an individual has learned to perform a task in the manner required.

In the following, clauses are recited to summarize some aspects and embodiments as disclosed in the foregoing.

C1. A device for performance support in a low-gravity environment, said device comprising: a first input (220A) for first data (BPD) indicative of a body pose of an individual; a second input (220B) for second data (GDD) indicative of a gaze direction of the individual; and processor circuitry (101) configured to: obtain the first data (BPD) on the first input (220A); obtain the second data (GDD) on the second input (220B); determine, based on the first data (BPD) and the second data (GDD), a first time series of body poses and a second time series of gaze directions that represent the individual performing a task; obtain a nominal performance scheme (NPS) for the task; perform an evaluation of the first and second time series in relation to the nominal performance scheme (NPS) for detection of a performance deviation; and provide, based on the evaluation, feedback data (FD) for presentation by a feedback device (203).

C2. The device of C1, wherein the processor circuitry (101) is configured to determine the first and second time series for a predefined time period (∆t), which is a subset of a total time period for performing the task.

C3. The device of any preceding clause, wherein the task comprises a predefined sequence of actions (ASD), and wherein the processor circuitry (101) is configured to, in the evaluation, evaluate the first and/or second time series to determine action data (Aij, Pij) that relates the first and/or second time series to the predefined sequence of actions (ASD), and selectively, depending on the action data (Aij, Pij), perform a deviation analysis for the detection of the performance deviation.

C4. The device of C3, wherein the action data (Aij, Pij) comprises at least one of: an action (Aij) deemed to correspond to the first and/or second time series, or a probability (Pij) that the action (Aij) corresponds to the first and/or second time series.

C5. The device of C4, wherein the processor circuitry (101) is configured to evaluate at least one of the action (Aij) or the probability (Pij) in relation to a validation criterion, which is based on the nominal performance scheme (NPS), and to selectively perform the deviation analysis if the validation criterion is violated.

C6. The device of C5, wherein the nominal performance scheme (NPS) comprises a definition of the predefined sequence of actions (ASD).

C7. The device of C5 or C6, wherein the validation criterion is violated if the action (Aij) deviates from one or more expected actions according to the predefined sequence of actions (ASD) and/or if the probability (Pij) is below a reference value.

C8. The device of any one of C5-C7, wherein the nominal performance scheme (NPS) comprises reference data (RD) that associates a respective action among the predefined sequence of actions with one or more allowable ranges for the body pose and/or the gaze direction of the individual, wherein the processor circuitry (101), in the deviation analysis, is configured to obtain momentary data (BP', GD') for the body pose and/or the gaze direction at a time point (tc) when the validation criterion is violated, and evaluate the momentary data (BP', GD') in relation to the reference data (RD) for detection of the performance deviation.

C9. The device of C8, wherein the momentary data comprises momentary orientations (BP') of a plurality of body parts, wherein the reference data (RD) associates the plurality of body parts with allowable ranges of orientation, and wherein the processor circuitry (101) is configured to detect the performance deviation as a deviation of a momentary orientation of a body part in relation to an allowable range (∆θn) of orientation for the body part, the allowable range (∆θn) of orientation being given by the reference data (RD).

C10. The device of C9, wherein the momentary orientation of the body part comprises an angle (θn) of the body part in relation to another body part.

C11. The device of any one of C8-C10, wherein the momentary data comprises a momentary gaze direction (GD'), and wherein the processor circuitry (101) is configured to detect the performance deviation as a deviation of the momentary gaze direction (GD') in relation to an allowable range (ΔGD) for the gaze direction, the allowable range (ΔGD) for the gaze direction being given by the reference data (RD).

C12. The device of any one of C3-C11, wherein the processor circuitry (101) is configured to determine, among the predefined sequence of actions (ASD), a subsequent action in relation to a current action, and cause the feedback device (203) to present the subsequent action.

C13. The device of any one of C3-C12, wherein the processor circuitry (101) comprises a trained machine learning-based model (232') which is configured to operate on the first and/or second time series for determination of the action data (Aij, Pij).

C14. The device of any preceding clause, wherein the processor circuitry (101) is further configured to identify at least one of a non-conforming body part or a non-conforming gaze direction associated with the performance deviation.

C15. The device of C14, wherein the feedback data (FD) is arranged to indicate said at least one of a non-conforming body part or a non-conforming gaze direction, and optionally to provide corrective instructions in relation to said at least one of a non-conforming body part or a non-conforming gaze direction.

C16. The device of any preceding clause, further comprising at least one of a first measurement arrangement (201) configured to generate the first data, a second measurement arrangement (202) configured to generate the second data, or the feedback device (203).

C17. A space suit for extravehicular activity, said space suit (2) comprising a device according to any preceding clause.

C18. A computer-implemented method of providing performance support in a low-gravity environment, said computer-implemented method comprising: obtaining (211) first data (BPD) indicative of a body pose of an individual from a first measurement arrangement (201); obtaining (212) second data (GDD) indicative of a gaze direction of the individual from a second measurement arrangement (202); determining (213), based on the first data (BPD) and the second data (GDD), a first time series of body poses and a second time series of gaze directions that represent the individual performing a task; obtaining (214) a nominal performance scheme (NPS) for the task; performing (215) an evaluation of the first and second time series in relation to the nominal performance scheme (NPS) for detection of a performance deviation; and causing (216) a feedback device (203) to present feedback data (FD) representing a result of the evaluation.

C19. A computer-readable medium comprising instructions which, when installed on a processor (401), causes the processor (401) to perform the method of C18.

3. Illumination-Based Assistance During Extravehicular Activity

This part of the disclosure relates to a technique of providing assistance to one or more individuals or users during EAV. This part of the disclosure is particularly, but not exclusively, related to an inventive concept of operating a computer device to process a set of rules to identify relevant user instructions in relation to one or more objects detected in the surroundings of the user(s) and provide the user instructions to the user(s) by selective projection of light in relation the object(s). The user instructions thereby provide active guidance to the individual, for example in relation to a task to be performed. The inventive concept reduces the reliance on cognitive processing by the user(s) to take decisions on how to proceed in a situation, and instead the cognitive processing of information about the surroundings in relation to the task at hand is offloaded to the computer device. This will serve to reduce the cognitive load on the user(s) and allow the user(s) to focus on implementing the task as well as possible. It may also improve the safety of the user(s), as well as user compliance with safety protocols and other plans, procedures and schemes that may be defined for individuals in space. The selective projection of light provides a convenient way of conveying the user instructions to the user(s) since it is independent of conventional audible communication and allows the user instructions to be distributed to any number of users. The illumination-based assistance according to the inventive concept is also intuitive to the user and may be provided without occluding or obstructing the user's field of vision.

Figure 15:
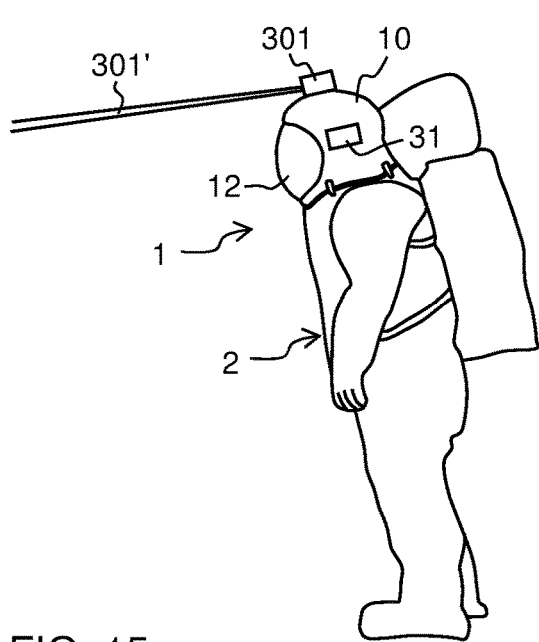
FIG. 15 is a side view of an individual dressed in a space suit comprising an illumination arrangement.

FIG. 15 illustrates an individual or user 1 that performs a task in space. An illumination arrangement 301 is attached to the space suit 2, in this example on the helmet 10. The illumination arrangement 301 is operable to project visible light 301' into the surroundings of the user. In the example of FIG. 15, a monitoring sensor 31 is also arranged on the helmet 10 to generate sensor data that is indicative of a detection space outside and around the space suit 2. In accordance with the above-mentioned inventive concept, the illumination arrangement 301 is operated to convey user instructions to the user 1, or to another user (not shown), in relation to objects that are detected based on the sensor data from the monitoring sensor 31.

Figure 16:
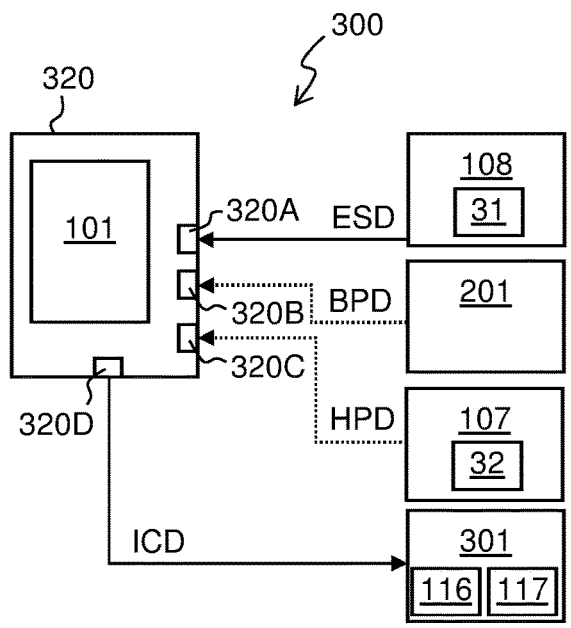
FIG. 16 is a block diagram of an example device for providing illumination-based assistance.

FIG. 16 shows a device 320 which is configured to provide illumination-based assistance in a low-gravity environment. The device 320 is part of a system 300, which also includes one or more monitoring sensors 31 (one shown), and the illumination arrangement 301. Optionally, the system 300 may also comprise a measurement arrangement 201 configured to generate first data indicative of the body pose of a user and/or a head tracking device 32 configured to generate second data indicative of the head pose of the user.

The monitoring sensor(s) 31 may be the same or similar as described in Chapter 1 above. External sensor data, ESD, which is generated by the monitoring sensor(s) 31, is indicative of objects in a detection space in relation to the monitoring sensor(s) 31. The detection space is defined by the volume in which the one or more monitoring sensors 31 are responsive to objects. The measurement data may be indicative of the position of an object and/or one or more other properties of an object, such as its shape, its temperature, its color, its composition, etc. The monitoring sensor 31 may be part of the arrangement 108 as described with reference to FIG. 2 and may be implemented as a vision sensor.

The illumination arrangement 301 is configured to generate visible light 301' (FIG. 15) based on illumination control data, ICD, provided by the device 320. In some embodiments, as shown in FIG. 16, the illumination arrangement 301 comprises at least part of the light control circuitry 116 and the light source 117 as described with reference to FIG. 2.

As noted above, the inventive concept involves a selective projection of visible light. In this context, "selective projection" implies that the visible light is spatially controlled to convey a user instruction in relation to one or more objects. In one example, the visible light 301' is spatially confined and selectively directed to a region on or close to an object. For example, the spatially confined light may be a collimated laser beam or an appropriately focused light beam, which is directed onto the region. Such a laser beam or focused light beam may or may not be spatially controlled to generate an image in the region. The image may convey the user instruction and may comprise one or more symbols and/or plain text. In another example, a static beam of light is projected within the detection space to illuminate the region, optionally by providing the above-mentioned image. In some embodiments, the illumination arrangement 301 comprises a laser projector or a video projector. The video projector may be a so-called short throw projector, which is capable of projecting an image at a distance of 1-10 meters. Depending on implementation, the illumination arrangement 301 may be operable to generate the visible light 301' with different visual cues, such as different images, colors, radiant intensities, etc.

As noted, the measurement arrangement 201 and the head tracking device 32 are optional. Like in Chapter 2, the first data generated by the measurement arrangement 201 is denoted body pose data, BPD. The measurement arrangement 201 may comprise one or more body pose sensors, for example as discussed with reference to the sensor arrangement 107 in FIG. 2. Like in Chapter 1, the second data generated by the head tracking device 32 is denoted head pose data, HPD. As shown, the head tracking device 32 may be included in the sensor arrangement 107.

The device 320 comprises processor circuitry 101, which may correspond to the control device 101 in FIG. 2, a first input device 320A configured to receive the ESD from the monitoring sensor(s) 31, a second (optional) input device 320B configured to receive BPD from the measurement arrangement 201, and third (optional) input device 320C configured to receive HPD from the head tracking device 322. The input devices 320A, 320B, 320C ("inputs") may comprise any conventional hardware interface, optionally combined with software, for receiving input signals. The device 320 further comprises an output device 320D ("output") configured to provide illumination control data, ICD, to the illumination arrangement 301.

In some embodiments, the device 320 in FIG. 16 is included in the space suit 2, for example by manufacture or retrofitting. In other embodiments, the device 320 is separate from the space suit 2. For example, the device 320 may be included in a vehicle, such as a spacecraft or a space exploration vehicle.

Likewise, the monitoring sensor(s) 31 and the illumination arrangement 301 may be included in or attached to the space suit 2, as shown in FIG. 15 and described hereinabove. However, in variants, the monitoring sensor(s) 31 and/or the illumination arrangement 301 is separate from the space suit 2. Thus, the system 300 may be fully integrated with the space suit 2, fully separated from the space suit 2, or anything in between.

The device 320 may be a unitary component or an assembly of separate parts. It is also conceivable that the device 320 includes one or more additional components of the system 300, for example the monitoring sensor(s) 31, the measurement arrangement 201, the head tracking device 32, or the illumination device 301.

Figure 17:
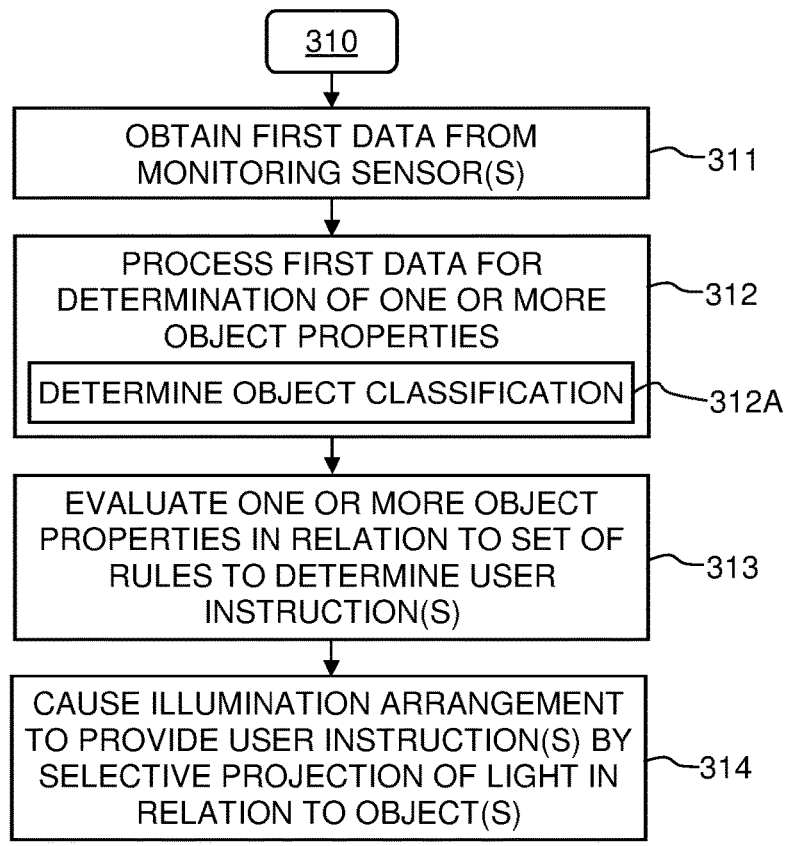
FIG. 17 is a flow chart of an example method for providing illumination-based assistance.

FIG. 17 is a flow chart of an example method 310 for providing assistance during EVA. The method 310 is computer-implemented and may be performed by the device 320 in FIG. 16. The method 310 may be implemented by hardware or a combination of hardware and software, for example by program instructions stored in a memory in the device 320.

In step 311, first data is obtained via the first input 320A. The first data corresponds to the ESD in FIG. 16. The ESD may include raw sensor data from the monitoring sensor(s) 31, pre-processed data, or an indication of detected objects, optionally together with an indication of one or more object properties.

In step 312, the first data (ESD) is processed for obtaining one or more object properties for a respective object. In this context, processing of the ESD may range from a full processing of raw sensor data, for example in accordance with step 142A in FIG. 7A, to an extraction of indications of object properties from the ESD. Irrespective of implementation, step 312 produces one or more object properties for a respective object detected by the monitoring sensor(s) 31. It may be noted that the monitoring sensor(s) 31 and/or the processing in step 312 may be targeted to specific objects of relevance, and that the object properties may be provided only for such objects of relevance. The one or more object properties may comprise one or more of position, shape, temperature, color, composition, speed, movement direction, acceleration, etc.

As indicated in FIG. 17, step 312 may comprise a step 312A of determining a classification of the object(s) into one or more object categories. Again, the classification may be obtained in step 312A by anything from a full processing of raw sensor data, for example in accordance with step 142B in FIG. 7A, to an extraction of one or more indications of object category from the ESD. As used herein, object category is considered to be an object property. The use of object categories may simplify the evaluation in step 313 (below). Non-limiting examples of object categories include "rock", "sharp object", "unstable ground", "stable ground", "hot object", "cold object", "tool", "tool category", "other user", "vehicle", "vehicle category", "manipulated object", "anchoring point", etc.

Step 313 comprises evaluating the one or more object properties in relation to a rule definition to determine one or more user instructions. The rule definition comprises a set of rules that defines a dedicated processing to be performed based on the one or more object properties. The rule definition may also comprise criteria for selecting specific user instructions based on the result of the dedicated processing. Each rule may thus be seen to define one or more criteria to be fulfilled by the one or more object properties in order for a specific user instruction to be selected. Examples of rules and resulting user instructions are presented below with reference to FIGS. 19-20.

In step 314, the illumination arrangement 301 is caused to provide the user instruction(s) determined by step 313 by selective projection of light in relation to one or more objects among the detected objects. In some embodiments, step 314 comprises generating control signals for operating the illumination arrangement 301 to perform the selective projection of light. In other embodiments, step 314 comprises providing high-level commands to the illumination arrangement 301, for example comprising one or more positions for the selective projection, and optionally an extent of the projected light.

In some embodiments, step 314 causes the illumination arrangement 301 to generate the light with a visual cue. In some embodiments, step 314 causes the illumination arrangement 301 to represent different user instructions with different visual cues, for example depending on urgency, risk level, type of user instructions, object property, rule, etc.

Figure 18:
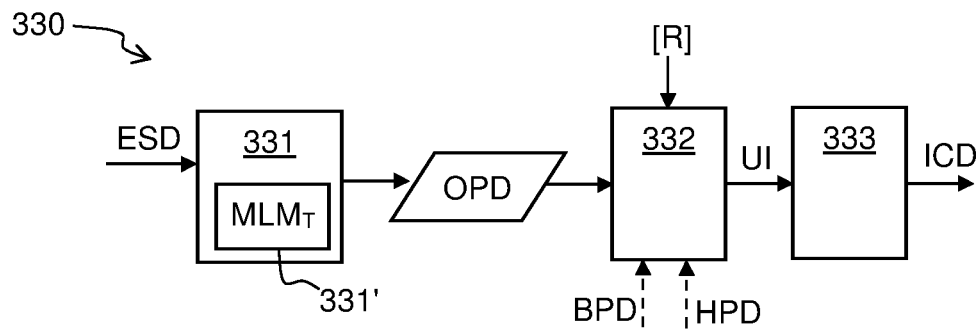
FIG. 18 is a block diagram of an example processing system for performing the method of FIG. 17.

FIG. 18 is a block diagram of an example processing system 330 which is configured to implement the method 310. The processing system 330 may be included in the device 320, for example as part of the processor circuitry 101. The processing system 330 comprises blocks or modules 331-333.

Module 331 implements step 312 (FIG. 17) and is configured to receive and process the ESD for determination of object properties. The output of module 331 is object property data OPD comprising on or more object properties for the respective object. In the illustrated example, module 331 comprises a trained machine learning-based module 331' ($MLM_T$) which is configured to determine object properties, optionally including object categories. The $MLM_T$ 331' may be one or more conventional algorithms for object detection, for example as listed with reference to FIG. 7A in Chapter 1.

Module 332 implements step 313 and is configured to evaluate the OPD from module 331 for determination of user instruction(s) UI. The UI may be output in the form of identifiers or indices of predefined user instructions. The evaluation by module 332 is made in relation to the abovementioned rule definition, here represented as [R]. As indicated, module 332 may also operate on BPD received on input 320B and/or HPD received on input 320C (FIG. 16). An example of the use of BPD and HPD will be given below with reference to FIG. 20E. In some embodiments, module 332 is configured to perform the evaluation by use of conditional control statements given by [R], for example IF statements or the like. The evaluation may for example be represented as a decision tree. In some embodiments, the module 332 is configured to perform the evaluation by use of artificial intelligence (AI) or machine learning (ML), which is configured to implement the rule definition [R].

Module 333 implements step 314 and configured to generate the ICD to represent the UI generated by module 332. As understood from the foregoing, module 333 may be configured to generate the ICD as control signals or high-level commands.

Figure 19:
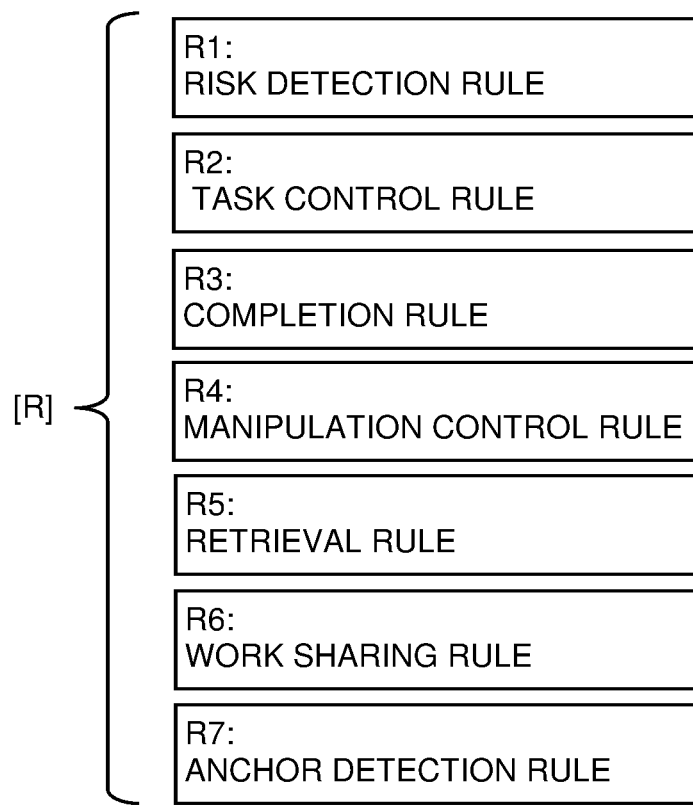
FIG. 19 is a schematic illustration of an example set of rules used in the method of FIG. 17.

FIG. 19 shows non-limiting examples of rules R1-R7 that may be included in the rule definition [R]. R1 is a risk detection rule for identifying at least one object that poses an actual or potential danger to a user. R2 is a task control rule for identifying an ordering among a plurality of objects for use in performing a task. R3 is a completion rule for identifying when a task is completed. R4 is a manipulation control rule for identifying a manipulation operation to be performed on an object. R5 is a retrieval rule for identifying at least one object that is at risk of leaving a field of vision and/or be beyond a reach limit of a user. R6 is a work sharing rule for selecting a user to perform an operation. R7 is an anchor detection rule for identifying at least one object that is a safe anchoring point. As noted above, a rule may define both how to process object properties and what user instruction(s) to provide.

Reverting to FIG. 18, module 332 may comprise logic configured to automatically identify the rule(s) to be evaluated based on the incoming OPD. Such logic may be seen to provide situational awareness and may be provided by AI, machine learning, etc. Alternatively or additionally, the selection of rule(s) to be evaluated by module 332 in a particular situation may be based on external input, for example by a user operating a manual control (cf. 112 in FIG. 2) or by inputting a voice command to a voice control device connected to module 332.

Examples of the use of rules R1-R7 in FIG. 18 will now be given with reference to FIGS. 20A-20G. The examples are given for illustrative purposes only and are not intended to limit the use of the respective rule or to exclude the use of other rules. Although the illumination arrangement 301 is attached to the helmet 10 of a user 1 in all examples, it may instead be attached to another portion of the space suit 2, or be provided separately from the individual 1, for example attached to a supporting structure of a vehicle. Although not shown in FIGS. 20A-20G, the examples presume that the illumination arrangement 301 is connected to the device 320, which is operated to control the selective projection of the visible light 301'.

Figure 20A:
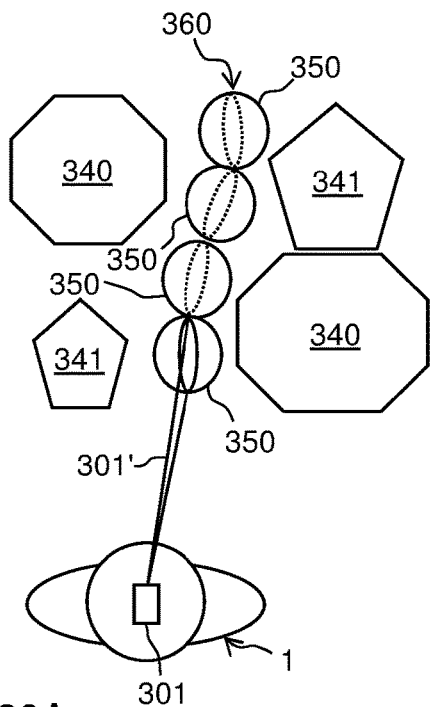
FIGS. 20A-20G are top plan views of application examples for the set of rules in FIG. 19.

In some embodiments, the device 320 is configured to cause the illumination arrangement 301, based on the risk detection rule R1, to provide a user instruction to actively guide a user to avoid objects that are identified to pose an actual or potential danger to the user. These embodiments will improve the safety of users during EVA. In the example of FIG. 20A, objects 340, 341 may represent different surface hazards for a user 1 walking on an extraterrestrial surface. For example, the octagonal objects 340 may correspond to lose or slippery surface material ("unstable surface"), and the pentagonal objects 341 may represent jagged rocks or rock edges ("rock", "sharp object"). In accordance with R1, the objects 340 may be detected based on shape, color or composition, and the objects 341 may be detected based on shape.

In one example, not shown, the beam 301' may be directed onto the objects 340, 341 to instruct the user to avoid the objects 340, 341. Different visual cues may be used to represent different risk levels, thereby presenting an ordering of risk to the user. Further, the objects to be illuminated may be determined based on their distance to the user, so that the beam 301' is preferentially directed onto the objects closest to the user.

In another example, as shown, the beam 301' may be directed to illuminate a safe area 350 for the user 1, to instruct the user to move to the illuminated area 350. By repeatedly performing the method 310 (FIG. 17), the device 320 is operable to guide the user 1 along a safe path 360 in relation to the objects 340, 341 as the user 1 moves along the illuminated areas 350. The user may be guided on a corresponding safe path when moving by gripping different objects, for example along the ladder 51 in FIG. 8B. Further, the safe path may be determined by considering the amount of gravity and the kinematic capabilities of the user, for example given by suit constraints, human kinetics, field of vision, etc.

In another example, R1 is configured to identify the objects to be avoided based on their temperature ("hot object", "cold object"). A user instruction not to touch the objects may be provided by guiding the beam 301' onto the objects to indicate that they pose a danger by their temperature.

Figure 20B:
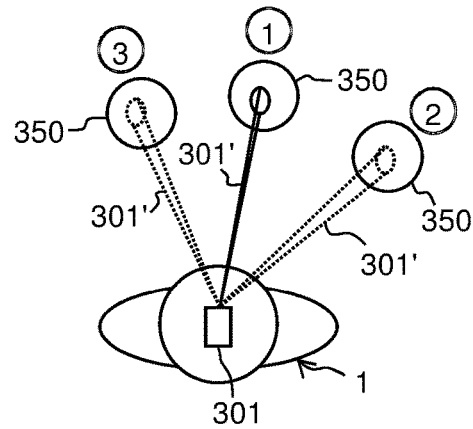

In some embodiments, the device 320 is configured to cause the illumination arrangement 301, based on the task control rule R2, to provide user instructions to actively guide the user 1 to use the objects in a specific order. The rule R2 may also define the objects properties to be used to detect the different objects that are to be ordered. The different objects may, for example, correspond to different tools or materials that are used in a task. These embodiments will enhance user compliance with safety protocols, working protocols, service manuals, etc. In the example of FIG. 20B, the beam 301' is sequentially directed to illuminate objects 350 in the order they are to be used, as indicated by encircled numbers 1, 2 and 3. The sequential illumination may be made before the user 1 initiates the task and/or as the user 1 completes various sub-steps of the task, for example to illuminate the next object to be used. Such sequential illumination is highly intuitive to the user. To the extent that two or more objects are to be used in combination, these objects may be simultaneously illuminated as part of the sequential illumination. The sequential illumination may also comprise projecting different images onto the different objects, with the different images designating the order of use. Such an image may be an alphanumeric, for example a number as shown in FIG. 20B. Instead of sequential illumination, the different objects may be simultaneously illuminated with a respective image that designates the order of use, for example an alphanumeric.

Figure 20C:
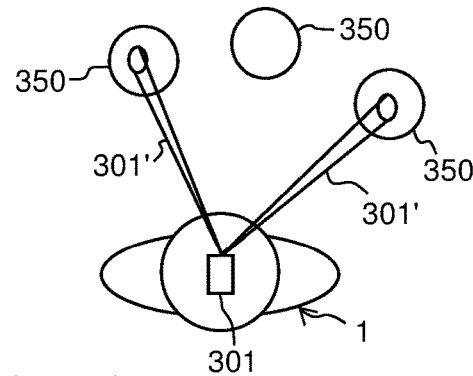

In some embodiments, the device 320 is configured to cause the illumination arrangement 301, based on the completion rule R3, to provide a user instruction to actively guide a user to collect a plurality of objects when a task is completed. These embodiments will mitigate the risk that the user forgets tools or material in space after task completion. In the example of FIG. 20C, the illumination arrangement 301 is operated to collectively illuminate two objects 350 by the beam 301' as an instruction to the user to collect these objects 350. The resulting collective illumination of the objects 350 is intuitive to the user.

Figure 20D:
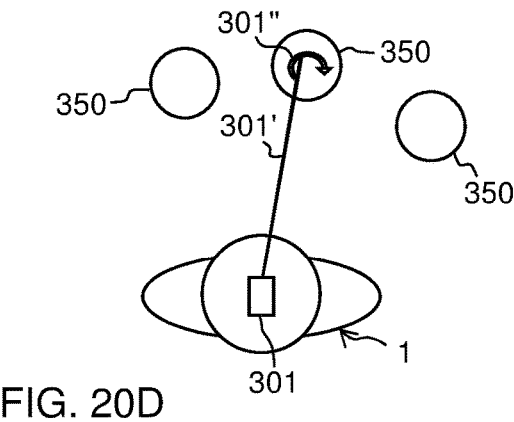

In some embodiments, the device 320 is configured to cause the illumination arrangement 301, based on the manipulation control rule R4, to provide a user instruction to actively guide a user on how to perform a dedicated manipulation operation. The user instruction thus guides the user on how to maneuver the object. The user instruction may be provided by an instructive image projected onto the object and/or by illuminating the object by a specific color representing the manipulation operation. These embodiments will facilitate for the user and prevent unintentional errors. In the example of FIG. 20D, the illumination arrangement 301 is operated to illuminate an object 350 with a beam 301' that defines an image 301" that indicates how the object, for example a bolt, is to be turned by the user 1. In some embodiments, the device 320 monitors the manipulation operation and provides, by the selective illumination, a user instruction to stop the manipulation operation. In the example of FIG. 20D, the device 320 may calculate the number of turns imposed on the object 350 and provide the beam 310' with a visual cue to instruct the user to stop turning the object, for example by changing the image/color.

Figure 20E:
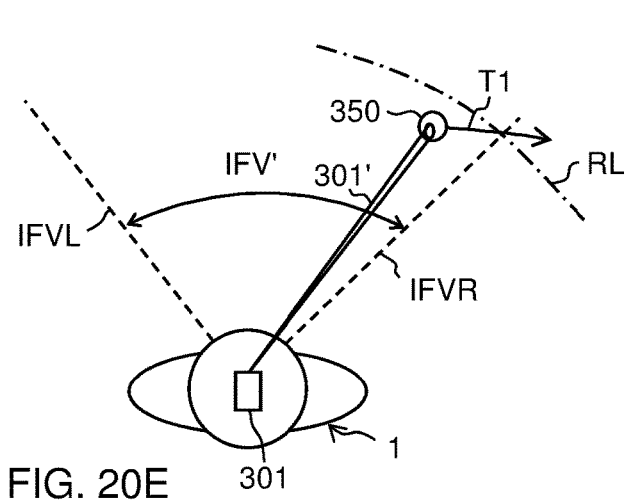

In some embodiments, the device 320 is configured to cause the illumination arrangement 301, based on the retrieval rule R5, to provide a user instruction to actively guide a user to retrieve an object. The object may be detected, based on R5, to be at risk of leaving the field of vision of the user and/or be beyond reach of the user. This object is denoted "potentially lost object", PLO, in the following. The user instructions may be provided by illuminating the object, optionally with a dedicated visual cue. These embodiments will reduce the risk that a user loses tools, materials or other equipment that are manipulated by the user during EVA. An example is shown in FIG. 20E, where RL designates the reach limit of user 1 and IFV' designates the field of vision of user 1, and the user instruction is provided by illuminating a PLO 350 by the beam 301'. In FIG. 20E, IFV' is bounded by a left-hand limit, IFVL, and a right-hand liming, IFVR. The PLO may be detected by evaluating the position of one or more objects in relation to RL and/or IFV'. Depending on implementation, the IFV' may be independent of head pose and defined only in relation to the helmet 10 (cf. static field of vision in Chapter 1), or be defined in relation to the head pose inside the helmet 10 (cf. dynamic field of vision in Chapter 1). The reach limit RL may be estimated based on the body pose of the user 1, by accounting for the location of the user's hands, the posture, the constraints of the space suit 2, and the impact of low gravity. Thus, in some embodiments, the device 320 is configured to, based on R5, estimate RL and/or IFV'. RL may be estimated based on BPD, and dynamic field of vision may be estimated based on HPD (cf. FIGS. 16 and 18). Static field of vision may be estimated based on an object property indicative of helmet orientation, if determined in step 312 (FIG. 17). In a further variant, IFV' is determined based on the gaze direction of the user, provided that the device 320 obtains gaze direction data, GDD, from a gaze tracking device (cf. 202 in FIG. 10). For example, IFV' may be set to correspond to the span of the central vision or the peripheral vison in relation to the gaze direction of the user, while also accounting for blockage by the visor (cf. 12 in FIG. 15).

In some embodiments, the device 320 is configured to determine a trajectory of a respective object within the detection space. The trajectory may be determined as described in Chapter 1 with reference to FIG. 7B. Subject to R5, the device 320 may detect the PLO by comparing the trajectory of the respective object to IFV' and RL, respectively. Thus, even if an object is well within IFV' and/or RL, it may nevertheless be identified as a PLO. In the example of FIG. 20E, a trajectory T1 is determined for object 350. Since the object 350 is close to RL and IFVR and has a trajectory T1 crossing RL and IFVR, the object 350 may be identified as a PLO.

Figure 20F:
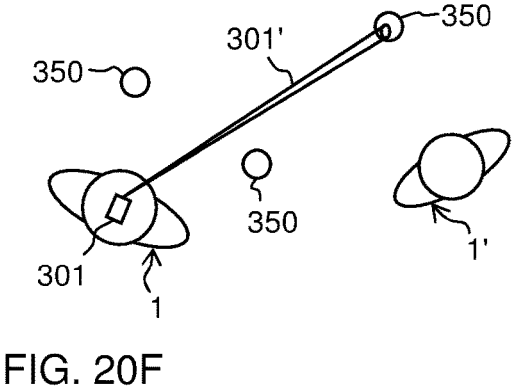

In some embodiments, the device 320 is configured to cause the illumination arrangement 301, based on the work sharing rule R6, to provide a user instruction to actively instruct a user to perform an operation. The user may be selected among a plurality of users based on one or more properties of the users and/or based on one or more properties of the object(s) to be manipulated in the operation. The one or more properties may be determined in step 312 (FIG. 17). It is to be noted that the monitoring sensor(s) 31 may be configured to also detect objects that represent users and that such "user objects" may be assigned one or more object properties. These embodiments will facilitate cooperation among users. In one example, the user may be selected based on the distance and/or movement direction between the object(s) to be manipulated and the plurality of users. In another example, the user may be selected in view of on-going or upcoming operations performed by the users. In some embodiments, the user instruction may be provided by illuminating the selected user. In other embodiments, the user instruction is provided by illuminating the object(s) to be manipulated by a visual cue that is associated with the selected user, for example a dedicated color, an image designating the user, etc. In the example of FIG. 20F, the illumination arrangement 301 of user 1 is operated to illuminate an object 350 by a beam 301' with a visual cue designating user 1' to manipulate the illuminated object 350.

Figure 20G:
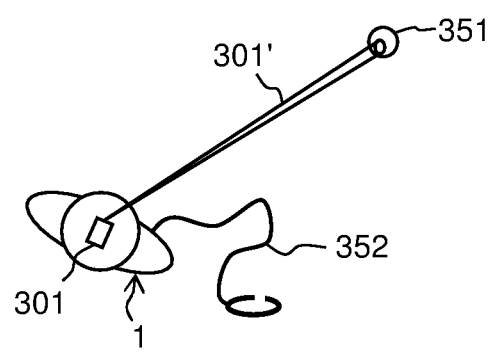

In some embodiments, the device 320 is configured to cause the illumination arrangement 301, based on the anchor detection rule R7, to provide a user instruction to actively guide a user to connect an anchoring device to at least one object, which is detected to be a safe anchoring point. The embodiments will improve the safety of the user. In the example of FIG. 20G, the object 351 is a safe anchoring point and is illuminated by beam 301' to instruct the user 1 to connect an anchoring line 352 to the object 351.

In all of the foregoing examples, the visible light 301' may be generated with visual cues to enhance the user's appreciation of the respective user instruction. A visual cue is a visual property and may comprise, in any combination, an image or pattern of projected light, a color of projected light, or a radiant intensity of projected light. Different visual cues may be applied to represent different user instructions and/or different objects and/or different object properties. For example, a user assignment (FIG. 20F) may be indicated by different visual cues for different users. Different temperatures of objects may be indicated by different visual cues. Objects at different distances to a user may be illuminated by different visual cues. The PLOs may be indicated by a dedicated visual cue. Associated objects (FIG. 20C) may be illuminated with the same visual cue. Objects may be illuminated by different visual cues depending on if they are deemed to pose a danger to the user or not, and/or to indicate different degrees of danger ("risk levels"). Objects may be illuminated by different visual cues depending on the direction of relative movement between a user and the object.

In some embodiments, the selection of objects to be illuminated may depend on the speed of the user or the relative speed between the user and the respective object. In an example, one or more rules in the rule definition [R] may be configured to cause the device 320 to illuminate finer-detailed objects if the (relative) speed is low, for example below a first speed limit, and to illuminate only the largest objects of relevance if the (relative) speed is high, for example above a second speed limit.

In some embodiments, a user is given the option to reject a user instruction provided by the device 320. For example, the user may reject a user instruction by operating a manual control (cf. 112 in FIG. 2) or by uttering a dedicated voice command. This may cause the device 320 to perform steps 311-314 anew to generate a new user instruction. In the example of FIG. 20A, the user 1 may reject an illuminated safe area 350. In the example of FIG. 20F, the user 1' may reject to be assigned an operation. In the example of FIG. 20G, the user 1 may reject an illuminated safe anchoring point 351.

In some embodiments, the device 320 is configured to instruct the user to pay attention to objects outside the field of vision by projecting a user instruction on a surface within the user's field of vision. The user instruction may be provided by any type of visual cue that causes the user to look around for an object of relevance. The visual cue may indicate a direction for the user to look/turn, for example in clear text or by an arrow. The field of vision may be determined as described with reference to FIG. 20E. The objects outside to the field of vision may result in a user instruction if they are deemed to pose a danger to the user, for example based on movement direction, trajectory, shape, color, composition, etc.

One advantage of some embodiments described in the foregoing that the illuminated objects, and the associated user instructions, are inherently visible to all users that are present at the detection space. Thus, users may cooperate even if a conventional communication system is unavailable.

Another advantage of some embodiments, compared to AR based solutions, is that user instructions are provided without bloating or cluttering the field of vision of the user.

Further, some embodiments enable the user to be instructed with respect to object properties that are imperceptible to the human eye, for example objects that are too hot or too cold to touch, or slippery or unstable ground.

Further, some embodiments enable tracking of objects in low gravity and provide early warning when an objects is about to move too far away from the user.

In the following, clauses are recited to summarize some aspects and embodiments as disclosed in the foregoing.

C1. A device for providing assistance during extravehicular activity, said device comprising: an input (320A) for first data (ESD) indicative of one or more objects in a detection space; and processor circuitry (101) configured to: obtain the first data (ESD) on the first input (320A); process the first data (ESD) for determination of one or more object properties for the one or more objects; evaluate, based on the one or more object properties, the one or more objects in relation to a set of rules ([R]) to determine one or more user instructions (UI); and cause an illumination arrangement (301) to provide the one or more user instructions (UI) by selective projection of light (301') in relation to the one or more objects.

C2. The device of C1, wherein the one or more object properties comprises a classification of a respective object into one or more object categories.

C3. The device of C1 or C2, wherein the processor circuitry (101) is configured to cause the illumination arrangement (301) to provide the one or more user instructions (UI) by selective projection of the light (301') onto at least one of the objects.

C4. The device of any preceding clause, wherein the processor circuitry (101) is configured to cause the illumination arrangement (301) to represent different user instructions by different visual properties of the light (301').

C5. The device of any preceding clause, wherein the set of rules ([R]) comprises at least one risk detection rule (R1) for identification of at least one object (340, 341) that poses an actual or potential danger, and wherein the processor circuitry (101) is configured to, based on the at least one risk detection rule (R1), cause the illumination arrangement (301) to provide a user instruction to avoid the at least one object (340, 341) by the selective projection of the light (301').

C6. The device of C5, wherein the processor circuitry (101) is configured to repeatedly process the first data (ESD), evaluate the one of more objects in relation to the at least one risk detection rule (R1) and cause the illumination arrangement (301) to provide the user instruction to avoid the at least one object (340, 341), to thereby illuminate a safe path (360) in relation to the at least one object (340, 341).

C7. The device of C5 or C6, wherein the at least one risk detection rule (R1) is configured to identify the at least one object (340, 341) based on its temperature.

C8. The device of any preceding clause, wherein the set of rules ([R]) comprises at least one task control rule (R2) for identification of an ordering among a plurality of objects for use in performing a task, and wherein the processor circuitry (101) is configured to, based on the at least one task control rule (R2), cause the illumination arrangement (301) to provide a user instruction, by the selective projection of the light (301'), to use the objects in accordance with the ordering.

C9. The device of C8, wherein the processor circuitry (101) is configured to cause the illumination arrangement (301) to sequentially project the light (301') onto the objects in accordance with the ordering.

C10. The device of any preceding clause, wherein the set of rules ([R]) comprises at least one completion rule (R3) for identification when a task is completed, and wherein the processor circuitry (101) is configured to, based on the at least one completion rule (R3), cause the illumination arrangement (301) to collectively project the light (301') onto the plurality of objects as a user instruction to collect the plurality of objects.

C11. The device of any preceding clause, wherein the processor circuitry (101) is configured to estimate at least one of a field of vision (IFV') of an individual or a reach limit (RL) of the individual, wherein the set of rules ([R]) comprises at least one retrieval rule (R5) for identification of at least one object (350) which is at risk of leaving the field of vision (IFV') and/or be beyond the reach limit (RL), and wherein the processor circuitry (101) is configured to, based on the at least one retrieval rule (R5), cause the illumination arrangement (301) to provide a user instruction to retrieve the at least one object (350) by the selective projection of the light (301').

C12. The device of C11, wherein the processor circuitry (101) is configured to estimate a trajectory (T1) of the one or more objects, and wherein the at least one retrieval rule (R5) is configured to identify said at least one object by comparing the trajectory (T1) to the field of vision (IFV') and/or the reach limit (RL).

C13. The device of C11 or C12, which comprises a further input (320B) for measurement data (BPD) indicative of a body pose of the individual, wherein the processor circuitry (101) is configured to estimate the reach limit (RL) of the individual based on the body pose.

C14. The device of any one of C11-C13, which comprises a further input (320C) for measurement data (HPD, GDD) indicative of a head pose and/or a gaze direction of the individual, wherein the processor circuitry (101) is configured to estimate the field of vision (IFV') of the individual based on the head pose and/or the gaze direction. C15. The device of any preceding clause, wherein the set of rules ([R]) comprises at least one manipulation control rule (R4) for identification of a manipulation operation to be performed on an object, and wherein the processor circuitry (101) is configured to, based on the at least one manipulation control rule (R4), cause the illumination arrangement (301) to provide a user instruction on how to perform the manipulation operation by the selective projection of the light (301').

C16. The device of any preceding clause, wherein the set of decision rules ([R]) comprises at least one work sharing rule (R6) for selection of an object, which corresponds to an individual (1; 1'), to perform an operation, and wherein the processor circuitry (101) is configured to, based on the at least one work sharing rule (R6), cause the illumination arrangement (301) to provide a user instruction to the individual (1; 1') to perform the operation by the selective projection of the light (301').

C17. The device of any preceding clause, wherein the set of decision rules ([R]) comprises at least one anchor detection rule (R7) for identification of at least one object (351) that is a safe anchoring point, and wherein the processor circuitry (101) is configured to, based on the at least one anchor detection rule (R7), cause the illumination arrangement (301) to provide a user instruction to connect an anchoring device (352) to the at least one object (351) by the selective projection of the light (301').

C18. The device of any preceding clause, further comprising at least one of a sensor arrangement (108) configured to generate the first data (ESD), or the illumination arrangement (301).

C19. A space suit for extravehicular activity, said space suit (2) comprising a device according to any preceding clause.

C20. A computer-implemented method of providing assistance during extravehicular activity, said computer-implemented method comprising:
obtaining (311) first data indicative of one or more objects in a detection space;
processing (312) the first data for determination of one or more object properties for the one or more objects;
evaluating (313), based on the one or more object properties, the one or more objects in relation to a set of rules to determine one or more user instructions; and
causing (314) an illumination arrangement to provide the one or more user instructions by selective projection of light in relation to the one or more objects.

C21. A computer-readable medium comprising instructions which, when installed on a processor (401), causes the processor (401) to perform the method of C20.

Figure 21:
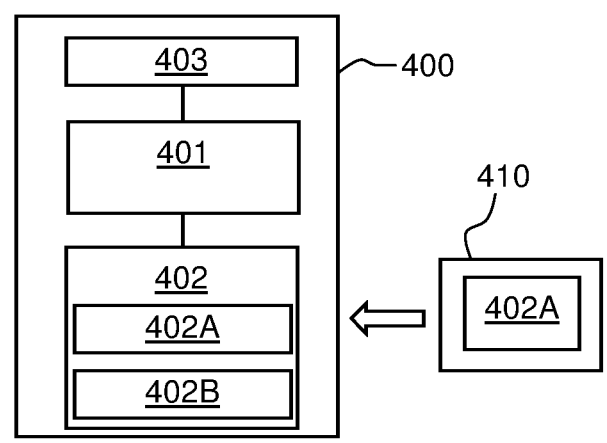
FIG. 21 is a block diagram of a machine that may implement methods, procedures and functions as described herein.

The structures and methods disclosed herein may be implemented by hardware or a combination of software and hardware. In some embodiments, such hardware comprises one or more software-controlled computer systems. FIG. 21 schematically depicts such a computer system 400, which comprises one or more processors 401, computer memory 402, and an interface device 403 for input and/or output of data. Depending on implementation, the computer system 400 may be included in an SSS, in any external computing resource in communication with an SSS, or any other computing resource. The interface device 403 may be configured for wired and/or wireless communication. The processor(s) 401 may, for example, include one or more of a CPU ("Central Processing Unit"), a DSP ("Digital Signal Processor"), a microprocessor, a microcontroller, an ASIC ("Application-Specific Integrated Circuit"), a combination of discrete analog and/or digital components, or some other programmable logical device, such as an FPGA ("Field Programmable Gate Array"). A control program 402A comprising computer instructions is stored in the memory 402 and executed by the processor(s) 401 to perform any of the methods, operations, functions or steps exemplified in the foregoing. As indicated in FIG. 21, the memory 402 may also store control data 402B for use by the processor(s) 401. The control program 402A may be supplied to the computer system 400 on a computer-readable medium 410, which may be a tangible (non-transitory) product (e.g. magnetic medium, optical disk, read-only memory, flash memory, etc.) or a propagating signal.

While the subject of the present disclosure has been described in connection with what is presently considered to be the most practical embodiments, it is to be understood that the subject of the present disclosure is not to be limited to the disclosed embodiments, but on the contrary, is intended to cover various modifications and equivalent arrangements included within the spirit and the scope of the appended claims.

Further, while operations are depicted in the drawings in a particular order, this should not be understood as requiring that such operations be performed in the particular order shown or in sequential order, or that all illustrated operations be performed, to achieve desirable results. In certain circumstances, parallel processing may be advantageous.

As noted, any and all combinations of the above-described concepts and embodiments are possible and may provide synergies. A few non-limiting examples are presented below. The embodiments in Chapter 1 may be combined with the embodiments in Chapter 3 to improve the ability of users to perceive dangers in their surroundings, by combining audio-based and illumination-based assistance. The illumination arrangement, as included in the embodiments in Chapter 3, may be used as a feedback device for the embodiments in Chapter 2, to provide performance-related feedback to a user. The next action as determined by some embodiments in Chapter 2 (cf. FIG. 13D) may be presented as an illumination-based user instruction by the embodiments in Chapter 3. Alternatively or additionally, the next action may be presented as a spatialized audio signal by use of the embodiments in Chapter 1. The audio signal may, by its spatial origin, inform the user on how and/or where to move in the next action.

What is claimed is:

1. A device for providing assistance during extravehicular activity, said device comprising: an input for first data indicative of one or more objects in a detection space; and processor circuitry configured to: obtain the first data on the first input; process the first data for determination of one or more object properties for the one or more objects; evaluate, based on the one or more object properties, the one or more objects in relation to a set of rules to determine one or more user instructions; and cause an illumination arrangement to provide the one or more user instructions by selective projection of light in relation to the one or more objects.

2. The device of claim 1, wherein the one or more object properties comprises a classification of a respective object into one or more object categories.

3. The device of claim 1, wherein the processor circuitry is configured to cause the illumination arrangement to provide the one or more user instructions by selective projection of the light onto at least one of the objects.

4. The device of claim 1, wherein the processor circuitry is configured to cause the illumination arrangement to represent different user instructions by different visual properties of the light.

5. The device of claim 1, wherein the set of rules comprises at least one risk detection rule for identification of at least one object that poses an actual or potential danger, and wherein the processor circuitry is configured to, based on the at least one risk detection rule, cause the illumination arrangement to provide a user instruction to avoid the at least one object by the selective projection of the light.

6. The device of claim 1, wherein the processor circuitry is configured to repeatedly process the first data, evaluate the one of more objects in relation to the at least one risk detection rule and cause the illumination arrangement to provide the user instruction to avoid the at least one object, to thereby illuminate a safe path in relation to the at least one object.

7. The device of claim 1, wherein the at least one risk detection rule is configured to identify the at least one object based on its temperature.

8. The device of claim 1, wherein the set of rules comprises at least one task control rule for identification of an ordering among a plurality of objects for use in performing a task, and wherein the processor circuitry is configured to, based on the at least one task control rule, cause the illumination arrangement to provide a user instruction, by the selective projection of the light, to use the objects in accordance with the ordering.

9. The device of claim 8, wherein the processor circuitry is configured to cause the illumination arrangement to sequentially project the light onto the objects in accordance with the ordering.

10. The device of claim 1, wherein the set of rules comprises at least one completion rule for identification when a task is completed, and wherein the processor circuitry is configured to, based on the at least one completion rule, cause the illumination arrangement to collectively project the light onto the plurality of objects as a user instruction to collect the plurality of objects.

11. The device of claim 1, wherein the processor circuitry is configured to estimate at least one of a field of vision of an individual or a reach limit of the individual, wherein the set of rules comprises at least one retrieval rule for identification of at least one object which is at risk of leaving the field of vision and/or be beyond the reach limit, and wherein the processor circuitry is configured to, based on the at least one retrieval rule, cause the illumination arrangement to provide a user instruction to retrieve the at least one object by the selective projection of the light.

12. The device of claim 11, wherein the processor circuitry is configured to estimate a trajectory of the one or more objects, and wherein the at least one retrieval rule is configured to identify said at least one object by comparing the trajectory to the field of vision and/or the reach limit.

13. The device of claim 11, which comprises a further input for measurement data indicative of a body pose of the individual, wherein the processor circuitry is configured to estimate the reach limit of the individual based on the body pose.

14. The device of claim 11, which comprises a further input for measurement data indicative of a head pose and/or a gaze direction of the individual, wherein the processor circuitry is configured to estimate the field of vision of the individual based on the head pose and/or the gaze direction.

15. The device of claim 1, wherein the set of rules comprises at least one manipulation control rule for identification of a manipulation operation to be performed on an object, and wherein the processor circuitry is configured to, based on the at least one manipulation control rule, cause the illumination arrangement to provide a user instruction on how to perform the manipulation operation by the selective projection of the light.

16. The device of claim 1, wherein the set of decision rules comprises at least one work sharing rule for selection of an object, which corresponds to an individual, to perform an operation, and wherein the processor circuitry is configured to, based on the at least one work sharing rule, cause the illumination arrangement to provide a user instruction to the individual to perform the operation by the selective projection of the light.

17. The device of claim 1, wherein the set of decision rules comprises at least one anchor detection rule for identification of at least one object that is a safe anchoring point, and wherein the processor circuitry is configured to, based on the at least one anchor detection rule, cause the illumination arrangement to provide a user instruction to connect an anchoring device to the at least one object by the selective projection of the light.

18. The device of claim 1, further comprising at least one of a sensor arrangement configured to generate the first data, or the illumination arrangement.

19. A space suit for extravehicular activity, said space suit comprising a device according to claim 1.

20. A computer-implemented method of providing assistance during extravehicular activity, said computer-implemented method comprising:
obtaining first data indicative of one or more objects in a detection space;
processing the first data for determination of one or more object properties for the one or more objects;
evaluating, based on the one or more object properties, the one or more objects in relation to a set of rules to determine one or more user instructions; and
causing an illumination arrangement to provide the one or more user instructions by selective projection of light in relation to the one or more objects.

* * * * *